(12) United States Patent
Takahashi et al.

(10) Patent No.: US 7,130,119 B2
(45) Date of Patent: Oct. 31, 2006

(54) THREE-DIMENSIONAL OBSERVATION APPARATUS AND THREE-DIMENSIONAL OBSERVATION SYSTEM

(75) Inventors: Susumu Takahashi, Iruma (JP); Kazuo Morita, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/347,326

(22) Filed: Jan. 21, 2003

(65) Prior Publication Data

US 2003/0137731 A1  Jul. 24, 2003

(30) Foreign Application Priority Data

Jan. 22, 2002  (JP)  ............... 2002-013322

(51) Int. Cl.
 G02B 27/22  (2006.01)
 G03B 21/00  (2006.01)
 G03B 21/60  (2006.01)

(52) U.S. Cl. ............ 359/462; 359/463; 359/458; 353/7; 353/48; 353/30

(58) Field of Classification Search ........... 359/462, 359/464, 15, 449, 451, 459, 630, 631, 633, 359/1, 13, 466; 353/7, 8, 9, 28, 29, 30, 34, 353/48, 49, 79; 345/7; 428/141
See application file for complete search history.

(56) References Cited

U.S. PATENT DOCUMENTS

| | | | |
|---|---|---|---|
| 3,525,807 A * | 8/1970 | Herriott et al. ......... 348/14.01 |
| 4,322,743 A | 3/1982 | Rickert |
| 4,984,871 A | 1/1991 | Martinez |
| 5,589,956 A * | 12/1996 | Morishima et al. ........... 359/15 |
| 5,609,939 A * | 3/1997 | Petersen et al. ............ 428/141 |
| 5,790,284 A * | 8/1998 | Taniguchi et al. ........... 359/15 |
| 6,095,652 A | 8/2000 | Trayner et al. |
| 6,266,182 B1 * | 7/2001 | Morita ...................... 359/383 |
| 6,752,498 B1 | 6/2004 | Covannon et al. |

FOREIGN PATENT DOCUMENTS

JP  51-24116  2/1976

* cited by examiner

Primary Examiner—Audrey Chang
(74) Attorney, Agent, or Firm—Arnold International; Bruce Y. Arnold

(57) ABSTRACT

A 3-D observation apparatus and 3-D observation system, as well as another observation apparatus, are provided such that it is possible to make observations while substantially in the same posture, without glasses, of either a plurality of 3-D images, or of a 2-D image and a 3-D image. Bright images are provided, there is great freedom in the position at which observations can be made, no distortion of the images is created even if the observer changes his position, and observations can be made with a comfortable observation posture.

25 Claims, 32 Drawing Sheets

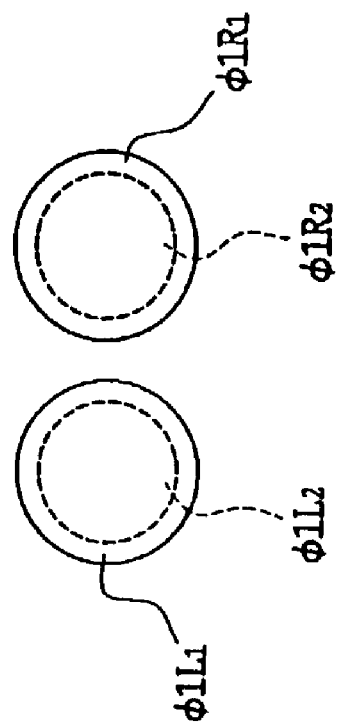
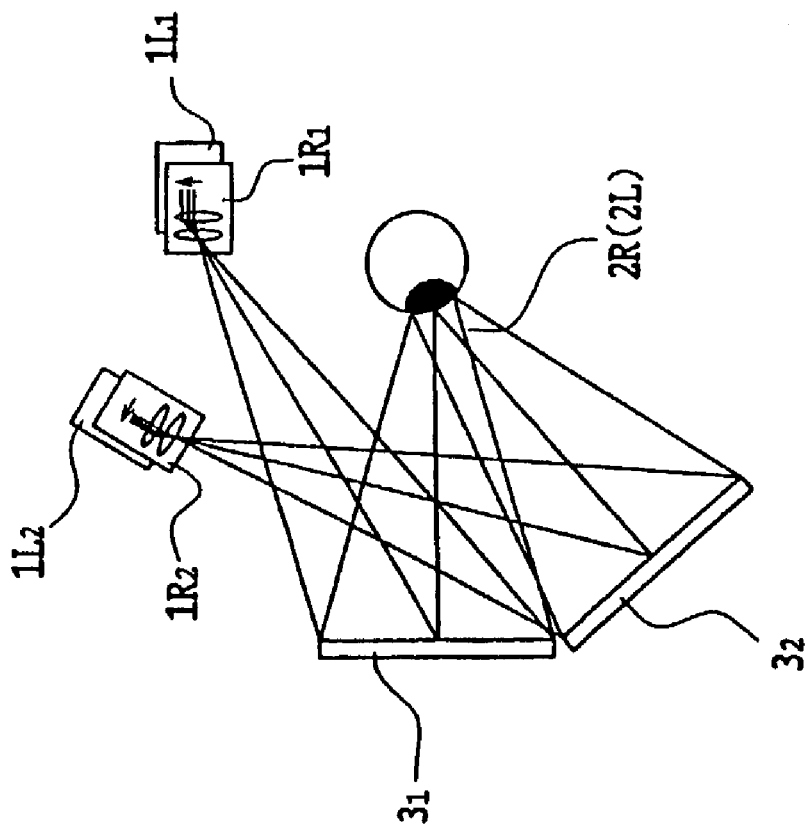
Fig. 4(b)
Fig. 4(a)

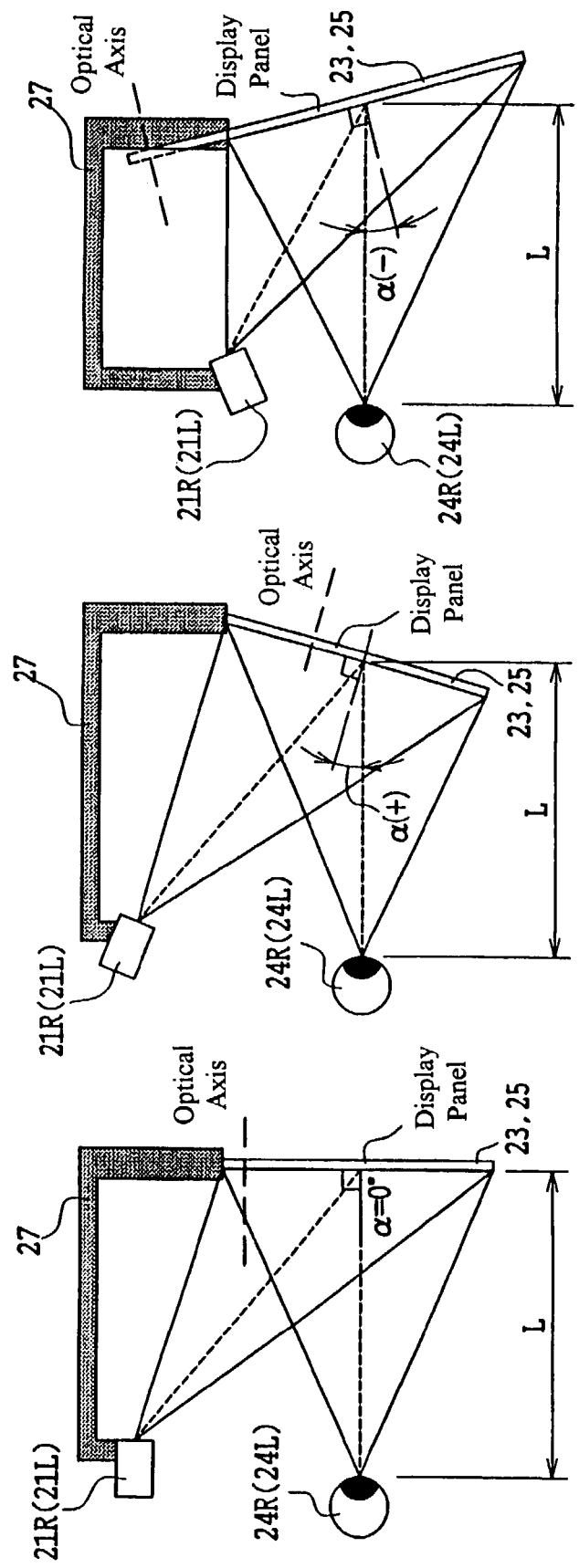

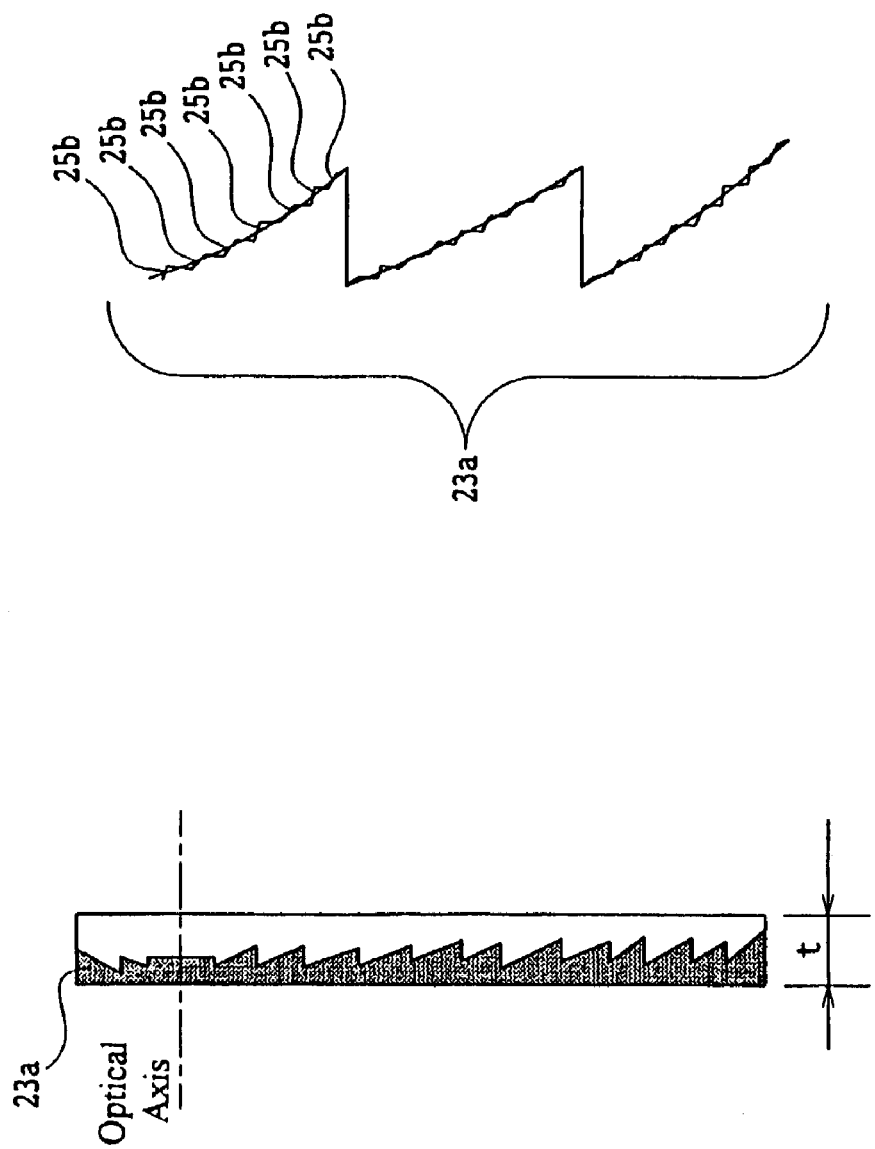

THREE-DIMENSIONAL OBSERVATION APPARATUS AND THREE-DIMENSIONAL OBSERVATION SYSTEM

CROSS-REFERENCE TO RELATED APPLICATION

This application is related in subject matter to U.S. application Ser. No. 10/270,641 entitled "Three-dimensional Observation Apparatus", which was filed Oct. 16, 2002. This application claims the benefit of priority from the prior Japanese Patent Application No. 2002-013322 filed Jan. 22, 2002, the contents of which are incorporated herein by this reference.

BACKGROUND OF THE INVENTION

The present invention relates to a three-dimensional observation apparatus and a three-dimensional observation system of the type that enables an individual to make three-dimensional (hereinafter 3-D) observations without using glasses. Previously, an observation apparatus as disclosed in Japanese Laid-Open Patent Publication S51-24116 has been proposed for such a 3-D observation apparatus. As shown in FIG. 32, this observation apparatus comprises two display apparatuses 51R and 51L, two concave mirrors 52R and 52L, and a single concave mirror 53 that faces the concave mirrors 52R and 52L. The concave mirrors 52R and 52L are designed and positioned so that the radii of curvature and the centers of curvature thereof match. In FIG. 32, reference numbers 54R and 54L designate the right and left pupils, respectively, of an observer.

FIG. 33 is a side view of the observation apparatus illustrated in FIG. 32. In FIG. 33, the top and bottom have been reversed in order to simplify understanding its operation and, in addition, the display apparatus has been omitted from the drawing. Furthermore, in FIG. 33 reference numbers 54R' (54L') and 54R" (54L") indicate conjugate positions of the observer's pupils. Each of the display apparatuses 51R (51L) shown in FIG. 32 is positioned in the range from the position PR($\infty$) (PL($\infty$)) (i.e., at infinity) to the focal point PR(f) (PL(f)) shown in FIG. 33. When the display apparatuses 51R (51L) are placed at the position PR($\infty$) (PL($\infty$)), light emitted from the display apparatuses 51R (51L) is reflected by the concave mirrors 52R (52L) and then forms an image at the front-side focal position A of the concave mirror 53. Furthermore, the light is then reflected by the concave mirror 53 and is guided to the observer's pupils 54R (54L) as substantially collimated light rays. When the display apparatuses 51R (51L) are placed at the front-side focal position PR(f) (PL(f)) of the concave mirrors 52R (52L), light emitted from the display apparatuses 51R (51L) is reflected by the concave mirrors 52R (52L) and becomes substantially collimated. Furthermore, after being reflected by the concave mirror 53, the light forms an image at the back-side focal point B of the concave mirror 53. Following this, the image spreads and is guided to the observer's pupils 54R (54L).

Furthermore, as this kind of conventional observation apparatus does not use a half-mirror, bright 3-D images may be obtained. However, with such a conventional 3-D observation apparatus, it is impossible to observe at one position while substantially in the same posture, the observation images from different display apparatuses. In addition, it is impossible to make multi-surface observations such as observations that allow 2-D images and 3-D images to be observed while substantially in the same posture.

Moreover, with the above-described 3-D observation apparatus, there are two concave mirrors that create distortions in the image, and consequently the positioning of the two concave mirrors which face each other is limited to positions that mutually compensate for this distortion. With this type of arrangement, distortion of the image and size of fluctuations in the focal point are determined in response to errors in installing the concave mirrors. In order to mitigate such problems, the surface precision of the concave mirrors must be kept high, while errors in installing the two concave mirrors must be kept extremely small. However, this results in high manufacturing and installation costs for the mirrors.

In addition, because the surface that the observer faces is that of a concave mirror, image distortion is large with respect to differences in observation position. Consequently, there is no freedom in observation position. This results in the observer's posture also being restricted, and results in observations being somewhat inconvenient.

Furthermore, in order to increase freedom in observation, it is necessary to enlarge the exit pupils. However, in an observation apparatus having the above-described design, enlarging the exit pupils requires that the concave mirrors be enlarged. Consequently, this results in the display apparatus as a whole becoming larger.

BRIEF SUMMARY OF THE INVENTION

A first object of the present invention is to provide a 3-D observation apparatus and 3-D observation system for an individual that obviates the need for glasses and wherein either multiple 3-D images, or a 2-D image and a 3-D image, can be readily observed. A second object of the invention is to enable bright images to be obtained. A third object of the invention is to provide greater freedom in positioning the observer. A fourth object of the invention is to reduce distortion in the display images when the pupil position of the observer moves. A fifth object of the invention is to allow 3-D images to be observed with more comfortable viewing postures.

BRIEF DESCRIPTION OF THE DRAWINGS

The present invention will become more fully understood from the detailed description given below and the accompanying drawings, which are given by way of illustration only and thus are not limitative of the present invention, wherein:

FIGS. 4(a) and 4(b) show a fourth embodiment of the 3-D observation apparatus of the present invention, with FIG. 4(a) being a side view and FIG. 4(b) being a diagram that illustrates the overlapping state of the observation pupils as created by different display apparatuses;

FIGS. 15(*a*)–15(*c*) show possible minor variations, as viewed from the side, of the embodiment illustrated in FIGS. 13(*a*), 13(*b*) and 14;

FIGS. 18(*a*) and 18(*b*) relate to another embodiment of a reflective 3-D display panel that can be used with the reflective 3-D display apparatus of the present invention, with FIG. 18(*a*) being a side view, and FIG. 18(*b*) being an enlarged view of the diffuser;

DETAILED DESCRIPTION

Figure 1B:
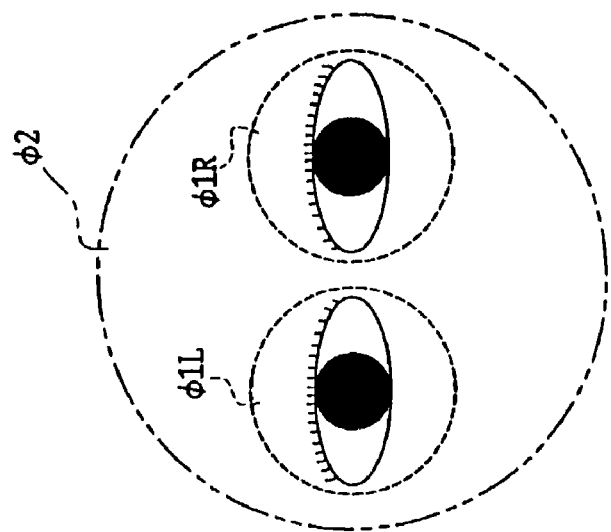
FIGS. 1(a) and 1(b) relate to a first embodiment of a 3-D observation apparatus according to the present invention, with FIG. 1(a) being a side view of the 3-D observation apparatus according to the embodiment, and FIG. 1(b) being an explanatory diagram showing the range of the observation pupils using the 3-D observation apparatus of the embodiment.

The 3-D observation apparatus of the present invention includes a 3-D display apparatus having a projection apparatus that projects images from two openings onto the same surface, a display unit with an imaging means that forms images of the two openings at the position of two pupils, the two pupils being the locations for an observer to place his right and left eyes in order to view a 3-D display, and a second display apparatus that is provided separate from the 3-D display apparatus such that images from the second display apparatus can be viewed by an observer while viewing images of the 3-D display apparatus. Thus, the 3-D observation apparatus of the present invention has a 3-D display apparatus and a second display apparatus that is separate from the 3-D display apparatus wherein both displays can be viewed simultaneously.

Before explaining the preferred embodiments, operation and advantages of the present invention will be described in general terms.

The 3-D observation apparatus of the present invention includes a 3-D display apparatus composed of a projection optical system that projects images from two openings onto a display surface. An imaging optical system is positioned at the display surface position and forms images of the two openings of the 3-D projection optical system. By the observer placing his eyes at these image positions, 3-D images may be observed. Also, a second display apparatus is positioned adjacent to the 3-D display apparatus. The second display apparatus projects images such that an observer can view images from the 3-D display apparatus and the second display apparatus nearly simultaneously. The second display apparatus may be a 3-D display apparatus or a 2-D display apparatus. In addition, the second display apparatus may comprise a self-illuminated display panel (such as a liquid crystal monitor, a plasma display, or the like). Moreover, a diffusion optical system may also be utilized so as to enlarge the observation pupils.

A summary of the operating principals of the 3-D observation apparatus and 3-D observation system of the present invention thus comprised will now be given.

With a 3-D display apparatus, a projection optical system projects right and left images through two openings onto a single display surface. An imaging optical system that is positioned at or near the display surface creates images of these two openings. When an observer places his right and left eyes at the locations of these images he is able to observe what are perceived as 3-D images.

A diffusion optical system is positioned at or near the display surface for the purpose of enlarging the projected images of the two openings to an extent that the projected images (which serve as pupils for viewing the images) do not mutually overlap. By this means, light rays that are projected from the two openings and have parallax with respect to the display surface are formed into right and left display images which may be observed by a viewer. Consequently, the observer can view what appears as a 3-D image without using glasses and while having a comfortable viewing posture.

Furthermore, if the system is arranged so that the observation pupils of a second display apparatus are within a portion of the observation pupils of the 3-D display apparatus, or vice versa, the same object can be observed using both observation systems. Or, of course, different objects may be observed through the two observation systems. Moreover, the observer, by slightly changing the position of the eyes, can alternatively and selectively observe different display images without changing his observation posture.

In addition, as in the 3-D observation apparatus of the present invention, if the 3-D display apparatus has a composition such that the right and left projection images form an image at the same display surface position, it is possible to match the convergence position of the right and left pupils of the observer with the in-focus position of the image. Consequently, no ergonomic discomfort is given to the observer. Accordingly, the observer can comfortably view what appear as 3-D images.

Furthermore, if the right and left openings are projected as enlarged images onto positions that correspond with the positions of an observer's pupils, it is possible to greatly increase the freedom of positioning the eyes, making it possible for the observer to make observations with a comfortable posture. If a diffusion optical system is provided at the display surface position, the pupils of the projection optical system can be smaller than would otherwise be required, which helps in boosting the image quality and compactness of the projection optical system.

Moreover, if a diffusion optical system is provided at the display surface, it is possible to prevent the effects of 3-D image distortion that are caused by differences in aberration correction within the light rays in the projection optical system. That is to say, because the light rays are made uniform by the diffusion action at the display surface, the observer can observe the same undistorted image regardless of where in the pupils the observer's eyes are placed.

Furthermore, if in the 3-D display apparatus the pupil imaging means for the right and left images is positioned at or near the display surface as in the 3-D observation apparatus of the present invention, there is no deterioration of image quality. Nor is there deterioration of image quality if a Fresnel surface is used as the pupil imaging means. And, if there is also a pupil enlargement action at the imaging position of the right and left images, there is no deterioration of image quality.

Moreover, in the 3-D display apparatus of the 3-D observation apparatus of the present invention, if the imaging optical system that is used for forming images at the observation pupils and the diffusion optical system that is used for pupil enlargement are positioned on a single display panel, it is possible to make the apparatus more compact and suppress deterioration of image quality even if the display panel is inclined.

Various embodiments of the present invention will now be described in detail with reference to the drawings.

Embodiment 1 of a 3-D Observation Apparatus

Figure 1A:
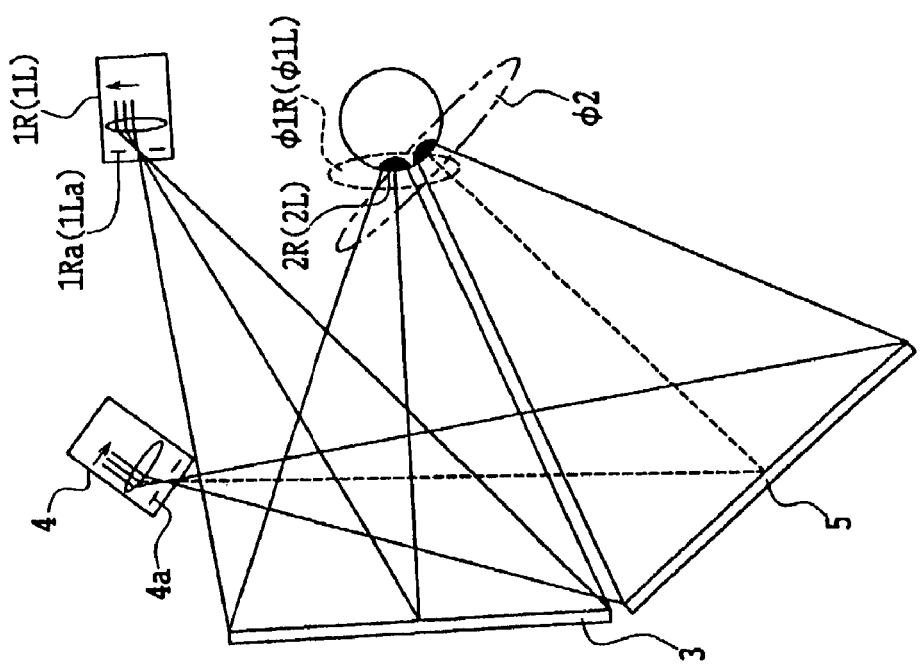

FIG. 1(a) is a side view of the 3-D observation apparatus according to this embodiment, and FIG. 1(b) is an explanatory diagram showing the range of the observation pupils using the 3-D observation apparatus of this embodiment. The 3-D observation apparatus of the present embodiment comprises a 3-D display apparatus and a 2-D display apparatus that is provided separate from the 3-D display apparatus, as shown in FIG. 1(a).

The 3-D display apparatus is composed of projection apparatuses 1R(1L) and a 3-D display panel 3. The projection apparatuses 1R(1L) are composed so as to project images from the two openings 1Ra(1La) onto the same flat, or slightly curved, surface. The 3-D display panel 3 is positioned on this surface, or nearby it, and is composed as a flat, or slightly curved, display unit having an imaging means for forming images of the two openings 1Ra(1La) at the position of the observer's pupils 2R(2L). The 3-D display apparatus creates right and left observation pupils ø1R(ø1L) at the position of the observer's right and left pupils via the two projection apparatuses 1R(1L) and the 3-D display panel.

The 2-D display apparatus is composed of a projection apparatus 4 and a 2-D display panel 5. The projection apparatus 4 is positioned at a central position with respect to the right and left eyes. The 2-D display panel 5 comprises a display unit having an imaging means that forms an image of one opening 4a provided in the projection apparatus 4 at the position of the observer's right and left pupils 2R(2L). Furthermore, the 2-D display apparatus is such that its observation pupil ø2 encompasses the observation pupils ø1R(ø1L) created by the 3-D display apparatus. Thus, an observer can observe 3-D images and 2-D images nearly simultaneously by simply changing the viewing direction of his eyes while remaining in the same position.

Embodiment 2 of a 3-D Observation Apparatus

Figure 2B:
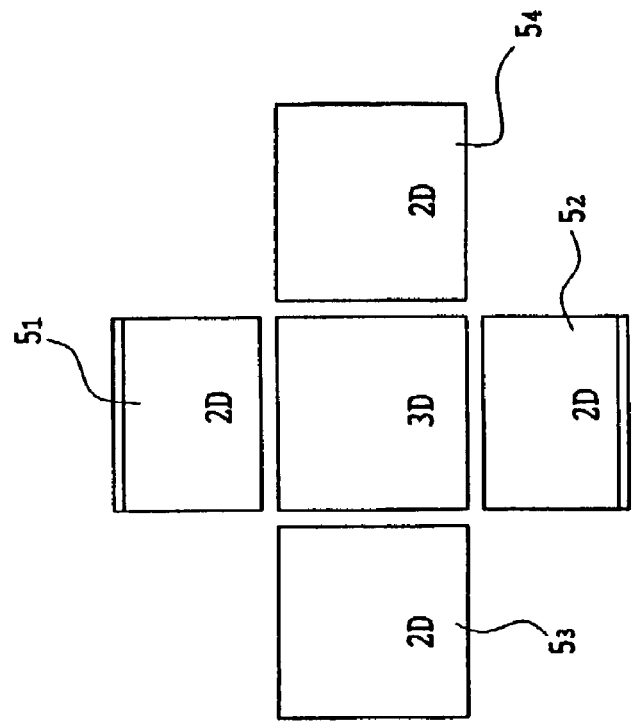
FIGS. 2(a) and 2(b) relate to a second embodiment of the 3-D observation apparatus of the present invention, with FIG. 2(a) being a side view of the 3-D observation apparatus according to the embodiment, and FIG. 2(b) being a diagram which illustrates the positions of the display panels illustrated in FIG. 2(a)
Figure 2A:
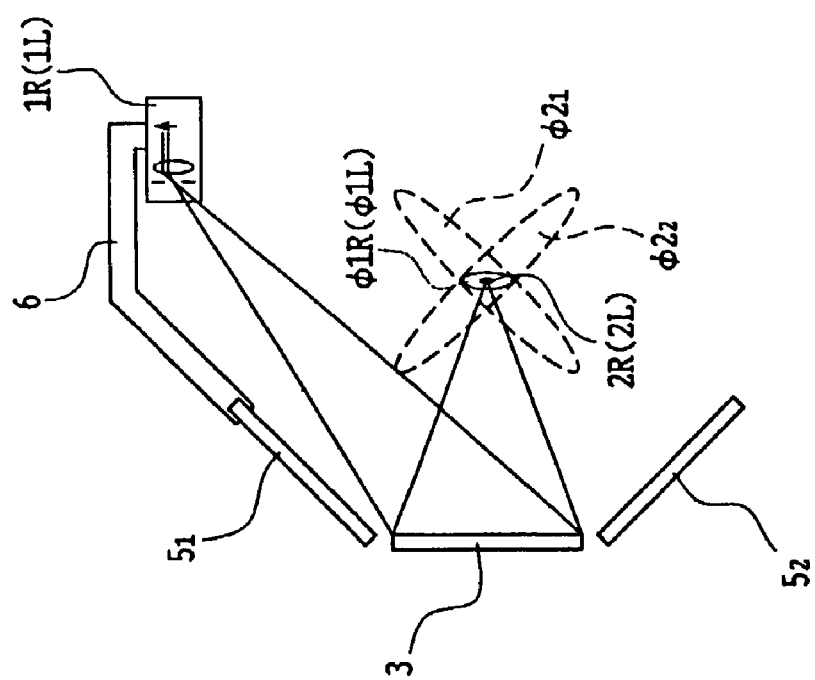

FIGS. 2(a) and 2(b) relate to a second embodiment of the 3-D observation apparatus of the present invention, with FIG. 2(a) being a side view of the 3-D observation apparatus according to the embodiment, and FIG. 2(b) being a diagram which illustrates the positions of the display panels illustrated in FIG. 2(a). The 3-D observation apparatus of this embodiment is composed of back-surface-illuminated or self-lit 2-D display panels $5_1$, $5_2$, $5_3$ and $5_4$ which are positioned as illustrated (FIG. 2(b)) at the top, bottom, left and right, respectively, around a 3-D display apparatus composed as in the first embodiment. Within the right and left observation pupils ø1R(ø1L) created by the 3-D display apparatus are contained observation pupils of the four 2-D display panels $5_1$, $5_2$, $5_3$ and $5_4$. As illustrated in FIG. 2(a) for the 2-D display panel $5_1$, the 2-D display panels are supported by a holding member 6.

Embodiment 3 of a 3-D Observation Apparatus

Figure 3:
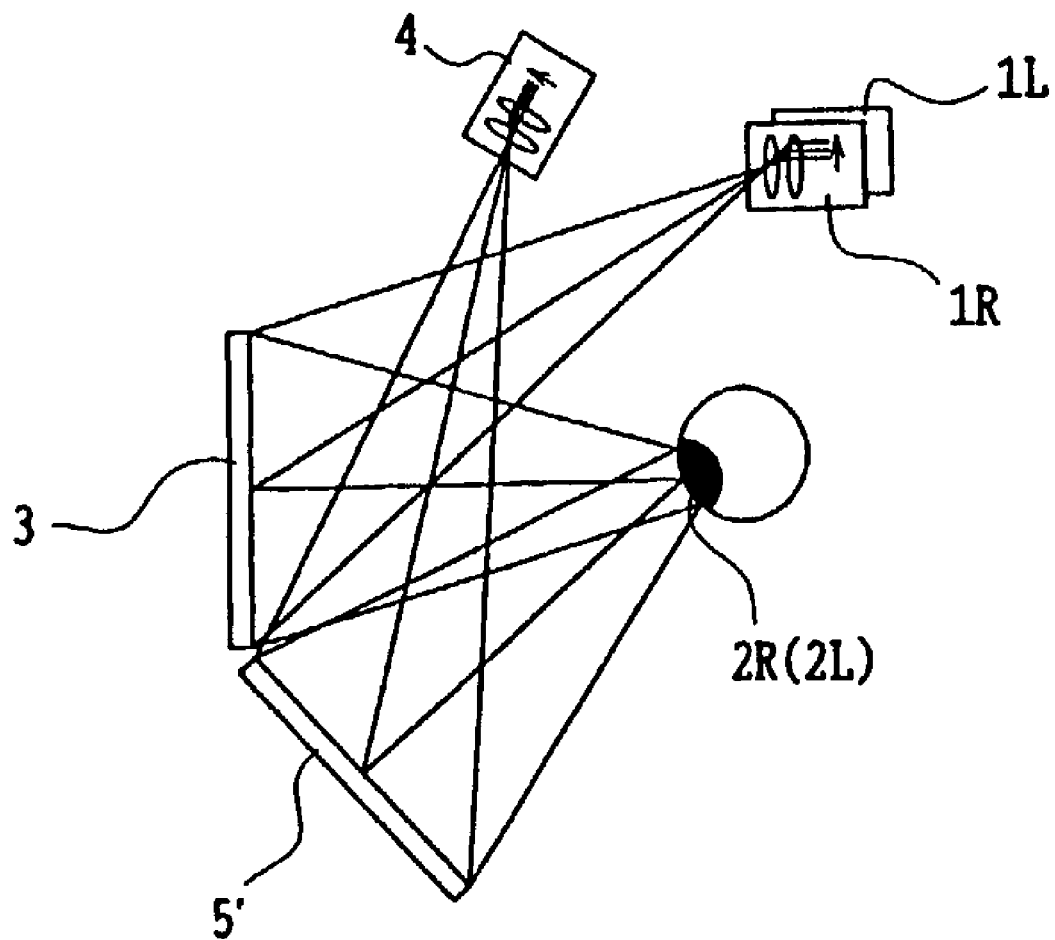
FIG. 3 is a side view of a third embodiment of the 3-D observation apparatus of the present invention.

FIG. 3 is a side view of a third embodiment of the 3-D observation apparatus of the present invention. This embodiment uses the same types of displays as used in Embodiment 1. Moreover, with this embodiment, a 2-D display panel 5' is formed of an HOE (holographic optical element) reflective mirror that is partially transparent, as in a heads up display. In addition, the projection apparatus 4 for the 2-D display panel 5' is provided with LED illumination as a light source which projects images to the HOE using light having a narrow wavelength. With the 3-D observation apparatus of the present embodiment, it is possible to observe 3-D images and 2-D images nearly simultaneously, and it is also possible to observe objects in a normal manner that are in the direction of view of the 2-D display panel 5'. Accordingly, it is possible for the observer to observe different display images nearly simultaneously while viewing a scene external to the display panels.

Embodiment 4 of a 3-D Observation Apparatus

FIGS. 4(a) and 4(b) show a fourth embodiment of the 3-D observation apparatus of the present invention, with FIG. 4(a) being a side view and FIG. 4(b) being a diagram that illustrates the overlapping state of the observation pupils as created by different display apparatuses.

As shown in FIG. 4(a), the 3-D observation apparatus of this embodiment comprises the 3-D display apparatus of the first embodiment as shown in FIG. 1, and another 3-D display apparatus of the same structure.

Furthermore, the apparatus is structured such that the left observation pupil ø1L$_2$ of the second 3-D display apparatus is contained in the left observation pupil ø1L$_1$ of the first 3-D display apparatus, and the right observation pupil ø1R$_2$ of the second 3-D display apparatus is contained in the right observation pupil ø1R$_1$ of the first 3-D display apparatus. Consequently, it is possible to observe nearly simultaneously both 3-D display images.

With the present embodiment, it is possible to observe a wide-angle image by displaying and nearly simultaneously observing continuous images via the two 3-D display apparatuses. In addition, the pupils of the two 3-D display apparatuses are made to roughly match, and consequently it is possible to increase the freedom of positioning in placing the eyes so as to be capable of simultaneous observation.

Embodiment 5 of a 3-D Observation Apparatus

Figure 5A:
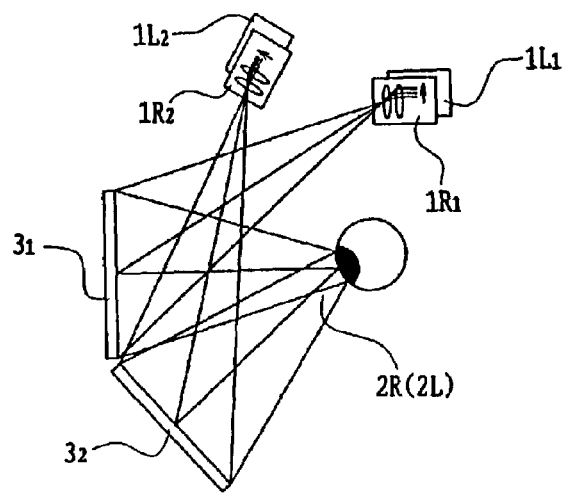
FIGS. 5(*a*)–5(*e*) relate to a fifth embodiment of the 3-D observation apparatus of the present invention, with FIG. 5(*a*) being a side view of the 3-D observation apparatus according to the embodiment, FIG. 5(*b*) being an explanatory diagram that shows the overlapping state of the observation pupils created by different display apparatuses, and FIGS. 5(*c*)–5(*e*) being diagrams that illustrate observable images when the observer's eyes are placed at different observation pupil positions.
Figure 5B:
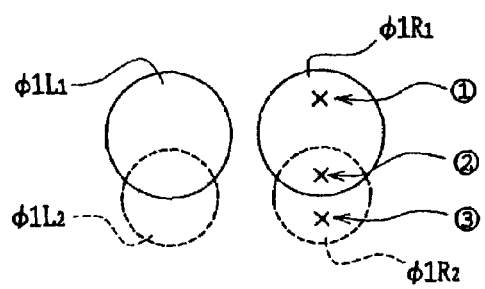
Figure 5C:
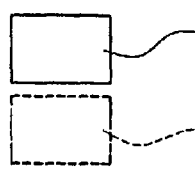
Figure 5D:
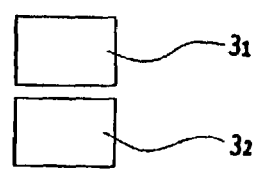
Figure 5E:

FIGS. 5(a)–5(e) relate to Embodiment 5 of the 3-D observation apparatus of the present invention, with FIG. 5(a) being a side view of the 3-D observation apparatus according to the embodiment, FIG. 5(b) being an explanatory diagram that shows the overlapping state of the observation pupils created by different display apparatuses, and FIGS. 5(c)–5(e) being diagrams that illustrate observable images when the observer's eyes are placed at different observation pupil positions. The 3-D observation apparatus of this embodiment uses the 3-D display apparatus of the first embodiment as shown in FIG. 1, and another 3-D display apparatus of the same structure, the same as the embodiment shown in FIG. 4(a).

Furthermore, as shown in FIG. 5(b), in this embodiment the left observation pupil ø1L$_1$ of the first 3-D display apparatus and the left observation pupil ø1L$_2$ of the second 3-D display apparatus mutually overlap in part, and the right observation pupil ø1R$_1$ of the first 3-D display apparatus and the right observation pupil ø1R$_2$ of the second 3-D display apparatus mutually overlap in part.

With the 3-D observation apparatus of this embodiment, when the observer's eyes are placed at and make observations from a position such as position 1 in FIG. 5(b), that is, within the observation pupils ø1R$_1$(ø1L$_1$) of the first 3-D display apparatus and these pupils do not overlap with the observation pupils ø1R$_2$ (ø1L$_2$) of the second 3-D display apparatus as shown in FIG. 5(a), it is possible to observe only the 3-D display image from 3-D display panel $3_1$ of the first 3-D display apparatus, as shown in FIG. 5(c).

When the observer's eyes are placed at and make observations from a position such as position 2 in FIG. 5(b), at which the observation pupils ø1R$_1$(ø1L$_1$) of the first 3-D display apparatus and the observation pupils ø1R$_2$(ø1L$_2$) of the second 3-D display apparatus overlap, it is possible to observe nearly simultaneously as real images the 3-D display images from both the 3-D display panels $3_1$ and $3_2$ as a wide-angle image, as shown in FIG. 5(d).

Furthermore, when the observer's eyes are placed at and make observations from a position such as position 3 in FIG. 5(b) that is within the observation pupils ø1R$_2$ (ø1L$_2$) of the second 3-D display apparatus and does not overlap with the observation pupils ø1R$_1$(ø1L$_1$) of the first 3-D display apparatus, it is possible to observe only the 3-D display image from the 3-D display panel $3_2$ of the second 3-D display apparatus, as shown in FIG. 5(e).

Thus, with the 3-D observation apparatus of this embodiment, it is possible to change the observed image to the desired image by slightly changing the position where the observer's eyes are placed, making it possible for the observer to see only the necessary image information.

3-D Observation System

Figure 6:
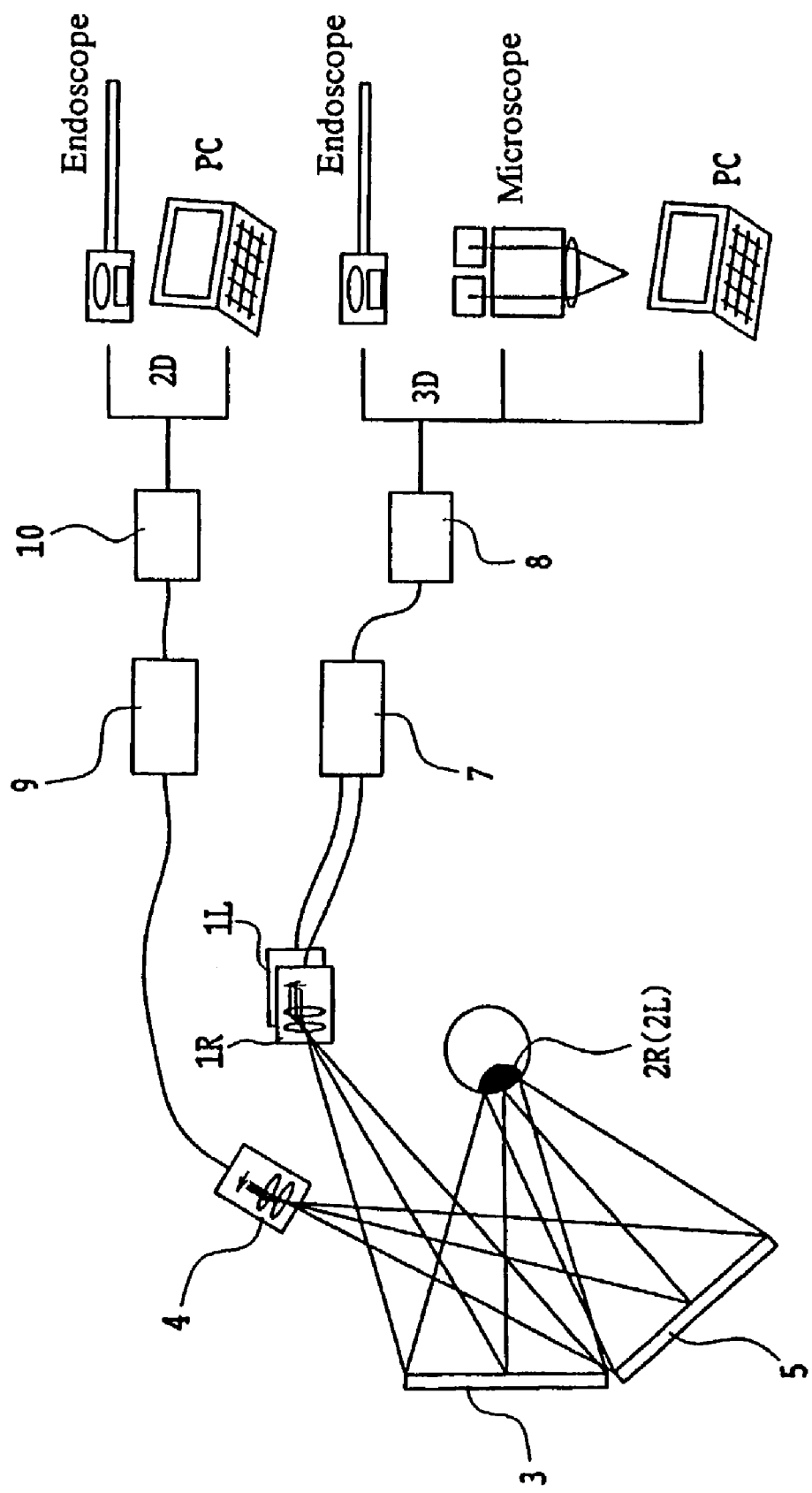
FIG. 6 illustrates a first embodiment of a 3-D observation system that uses an embodiment of a 3-D observation apparatus according to the present invention.

FIG. 6 illustrates a first embodiment of a 3-D observation system that uses an embodiment of a 3-D observation apparatus according to the present invention. In FIG. 6, the system of a 3-D observation apparatus employs a 3-D display apparatus and a 2-D display apparatus, but the basic summary of the control system used in the present embodiment can be applied to all of the 3-D observation apparatuses of the present invention. In this embodiment, the right and left projection apparatuses 1R(1L) of the 3-D display apparatus are connected to a 3-D image control apparatus 7, and the projection apparatus 4 of the 2-D display apparatus is connected to a 2-D image control apparatus 9. The 3-D image control apparatus 7 sends data of right and left images to the right and left projection apparatuses 1R(1L) used by the 3-D display apparatus by selectively inputting via a switcher 8, the desired image out of the images photographed by the right and left cameras provided in the 3-D image input apparatus, such as a 3-D endoscope, a 3-D microscope, or 3-D images having parallax created via a personal computer.

The 2-D image control apparatus 9 sends an image to the projection apparatus 4 used by the 2-D display apparatus by selectively inputting via a switcher 10 the desired image out of images photographed by a camera of the 2-D image input apparatus such as that of a 2-D endoscope, or a 2-D image created by a personal computer.

In addition, in this embodiment, switchers 8 and 10 are provided, but it would also be fine for switchers to not be provided and for each of the image control apparatuses 7 and 9 to be directly connected to the desired image input apparatuses so that, in each of the image control apparatuses 7 and 9, the type of input image connected is identified and the image is sent to the projection apparatuses 1R(1L) or 4.

Figure 7:
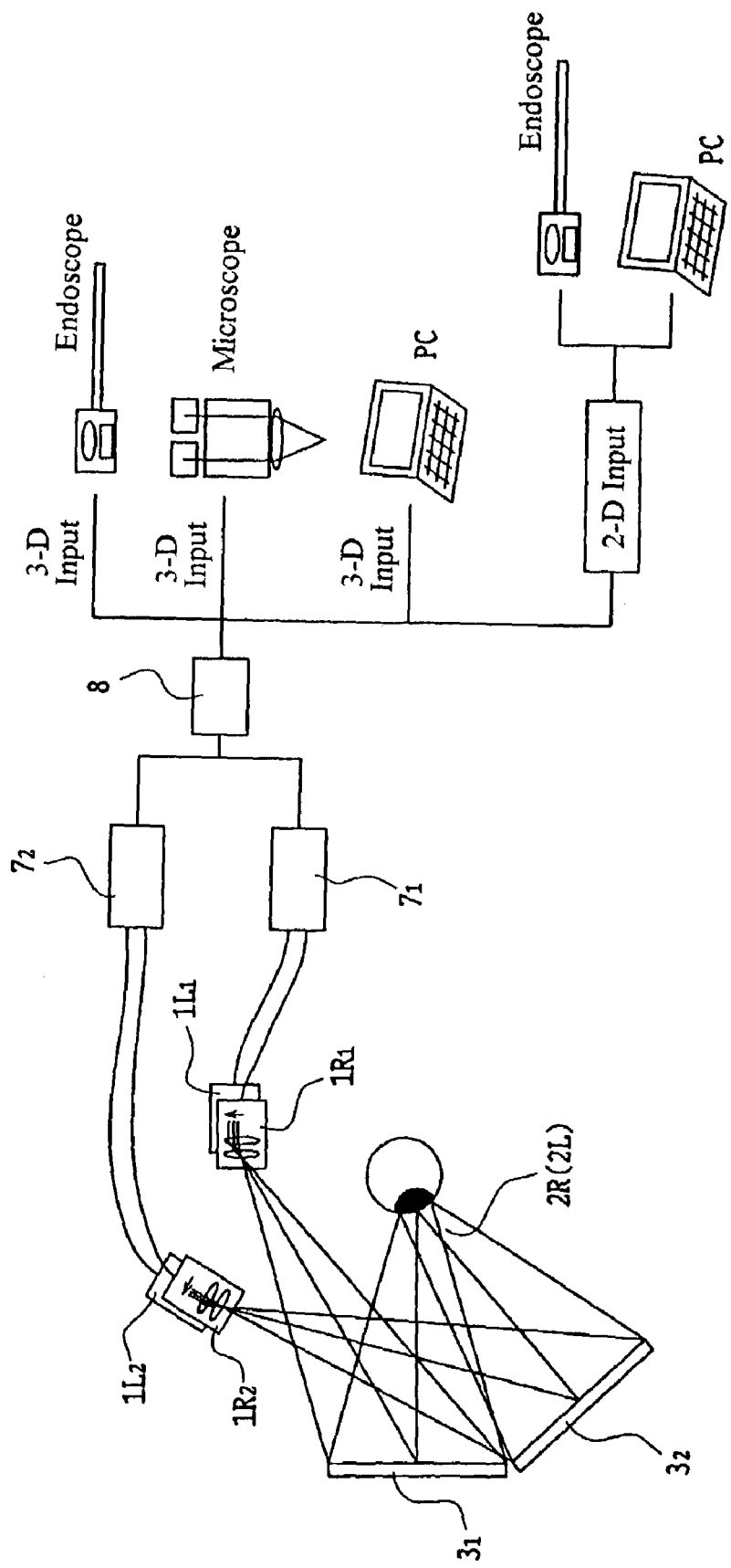
FIG. 7 shows a second embodiment of a 3-D observation system that uses an embodiment of a 3-D observation apparatus according to the present invention.

FIG. 7 shows a second embodiment of a 3-D observation system that uses an embodiment of a 3-D observation apparatus according to the present invention. In FIG. 7, a system of 3-D observation apparatuses is shown which is comprised of the 3-D display apparatuses shown in FIG. 4(a) and FIG. 5(a), but the basic overview of the control system used in this embodiment can be applied to all of the 3-D observation apparatuses of the present invention.

In this embodiment, the right and left projection apparatuses $1R_1(1L_1)$ of the first 3-D display apparatus are connected to a first 3-D image control apparatus $7_1$, and the projection apparatuses $1R_2(1L_2)$ of the second 3-D display apparatus are connected to a second 3-D image control apparatus $7_2$.

The first and second 3-D image control apparatuses send data for right and left images to the right and left projection apparatuses $1R_1(1L_1)$, $1R_2(1L_2)$ used by the desired first or second 3-D display apparatus by selectively inputting via a switcher 8 the desired image out of the images photographed by right and left cameras provided in the 3-D image input apparatus, such as a 3-D endoscope, a 3-D microscope, or 3-D images having parallax created via a personal computer, as well as images photographed by a camera provided in the 2-D image input apparatus such as a 2-D endoscope or 2-D images created via a personal computer. In addition, in the case of a 3-D display image, the same signal is sent to the right and left projection apparatuses. Additionally, in the present embodiment, a switcher 8 is provided, but the apparatus may omit the switcher 8, such that the respective image control apparatuses are directly connected to the desired image input apparatus, and such that the type of input image connected to each of the image control apparatuses $7_1$ and $7_2$ is identified and an image is sent to each of the projection apparatuses $1R_1(1L_1),1R_2(1L_2)$.

Next, embodiments of products that apply the 3-D observation apparatus of the present invention will be described.

Embodiment 1 of a Product

Figure 8B:
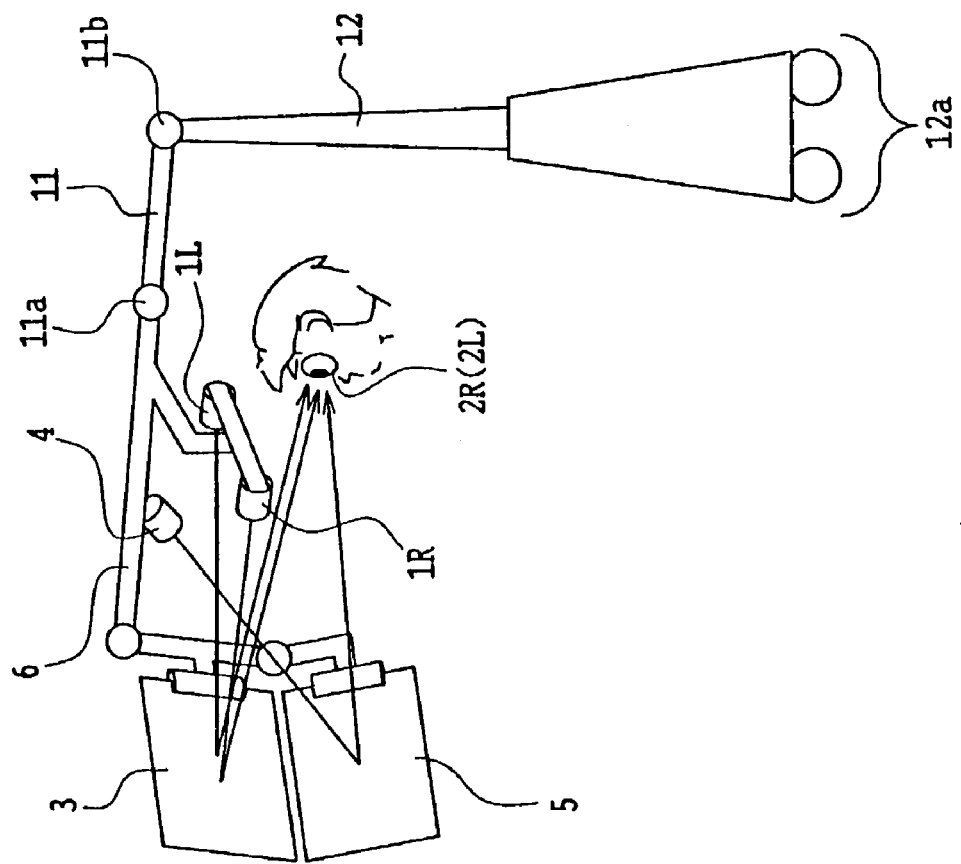
FIGS. 8(*a*) and 8(*b*) relate to a first embodiment of a product that uses the 3-D observation apparatus of the present invention, with FIG. 8(*a*) showing the 3-D observation apparatus as viewed from the side, and FIG. 8(*b*) being an overall view of the product.
Figure 8A:
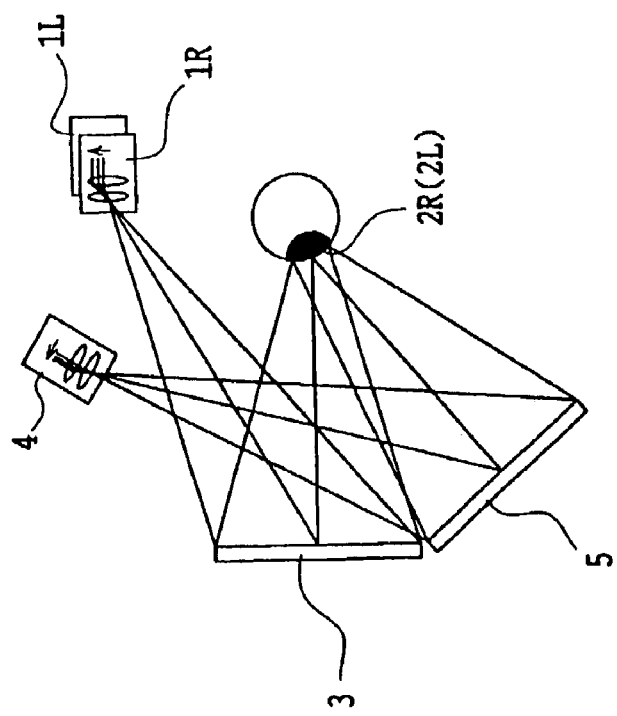

FIGS. 8(a) and 8(b) relate to a first embodiment of a product that uses the 3-D observation apparatus of the present invention, with FIG. 8(a) showing the 3-D observation apparatus as viewed from the side, and FIG. 8(b) being an overall view of the product. The product of this embodiment comprises a reflective-type observation apparatus composed of right and left projection apparatuses 1R(1L), projection apparatus 4, and the display panels 3 and 5. In this embodiment, a 3-D display panel and a 2-D display panel (as in FIGS. 1(a) and 3) are each supported by a holding member 6. A support arm 11 supports the holding member 6 as well as the projection apparatuses 4 and 1R(1L). A support unit main body 12 having casters 12a supports the support arm 11.

The 3-D observation apparatus is structured such that images with parallax are mutually projected to the display panel 3 from the right and left projection apparatuses 1R(1L) and are reflected by the display panel 3, the observation pupils corresponding to the right and left eyes of the observer are enlarged, and an image is formed. The holding member 6 is moveably connected to the support arm 11 via a connecting unit 11a, and the support arm 11 is moveably connected to the support unit main body 12 by a connecting unit 11b. By moving the holding member and the support arm in the desired direction, it is possible to change the observer's observation posture. In addition, casters 12a are provided on the support unit main body 12, and by moving the support unit main body 12 it is possible to change the observation position.

Embodiment 2 of a Product

Figure 9:
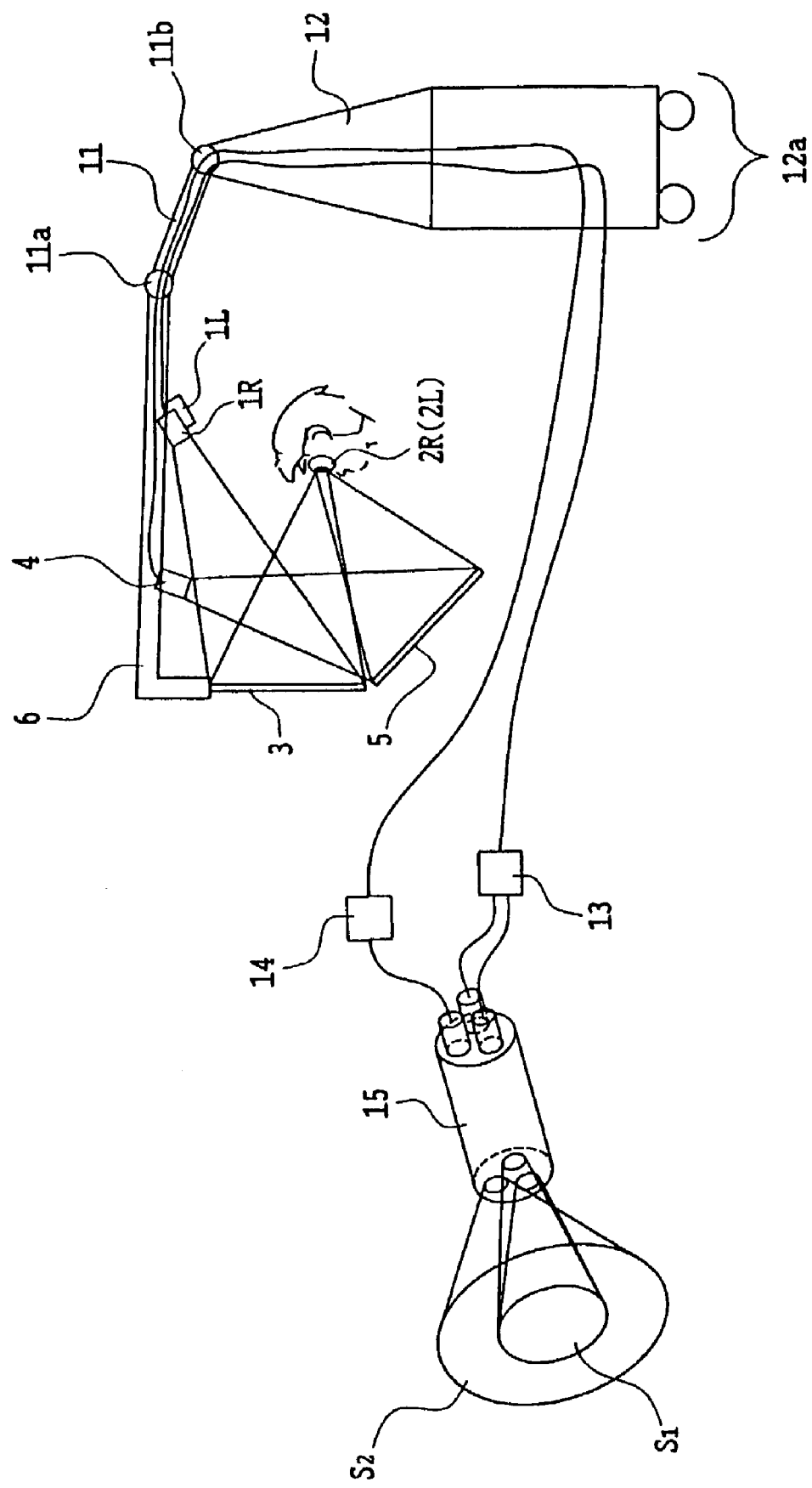
FIG. 9 shows a second embodiment of a product that uses the 3-D observation apparatus of the present invention.

FIG. 9 shows a second embodiment of a product that uses the 3-D observation apparatus of the present invention. This embodiment uses a 3-D observation system wherein a 3-D display apparatus is connected to a 3-D camera control unit 13, a 2-D display apparatus is connected to a 2-D camera control unit 14, and each of the camera control units 13 and 14 are connected to an endoscope 15 capable of 3-D observations and 2-D observations. The endoscope 15 is comprised such that 2-D observations have a wide-angle field of view $S_2$ that includes the field of view $S_1$ used for 3-D observations. In addition, the camera control units 13 and 14 are such that it is possible to adjust the display magnification, brightness, contrast and color tone of the image.

With the system of this embodiment, it is possible to nearly simultaneously observe 3-D observation images and wide-angle 2-D images via the endoscope 15. In the system of this embodiment, an endoscope 15 capable of 3-D observations and 2-D observations is used as the image input apparatus, but the system may instead employ an image input apparatus composed of a combination of an endoscope and a microscope, with one of these devices providing 3-D images and the other providing 2-D images.

Next, an example of a 3-D display apparatus that is used in the 3-D observation apparatus of the present invention will be described.

Embodiment 1 of a 3-D Display Apparatus

Figure 10A:
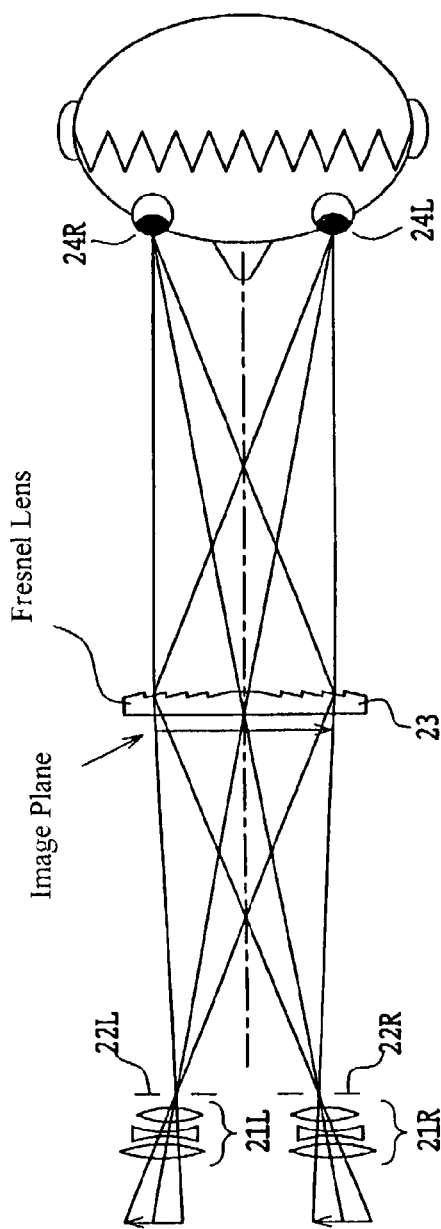
FIGS. 10(*a*) and 10(*b*) are explanatory diagrams of the 3-D display apparatus of the present invention, with FIG. 10(*a*) showing one configuration of a transmissive 3-D display apparatus and with FIG. 10(*b*) showing one configuration of a reflective 3-D display apparatus.
Figure 10B:
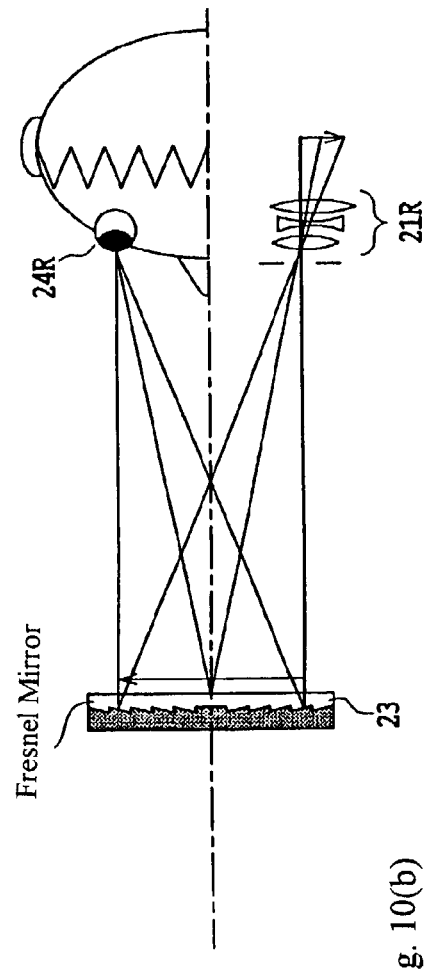

FIGS. 10(a) and 10(b) are explanatory diagrams of an embodiment of a 3-D display apparatus of the present invention, with FIG. 10(a) showing one configuration of a transmissive 3-D display apparatus and with FIG. 10(b) showing one configuration of a reflective 3-D display apparatus. In FIG. 10(b), only the composition for the right eye is shown (i.e., the composition for the left eye is omitted for clarity of illustration). The 3-D display apparatuses shown in FIGS. 10(a) and 10(b) include projection optical systems 21R and 21L as projection apparatuses, along with an imaging optical system 23 and a diffusion optical system (not shown in FIGS. 10(a) or 10(b)). The projection optical systems 21R and 21L are provided so as to project an image from the two openings 22R and 22L onto the same display surface. The imaging optical system 23 is provided so as to form an image from the image of the openings 22R and 22L of the projection optical system at the observer's pupils 24R and 24L. The diffusion optical system has the function of enlarging the observation pupils. Both the imaging optical system 23 and the diffusion optical system are placed at the display surface position.

The display surface position is the imaging position for the image projected from the projection apparatus. Furthermore, in addition to the imaging optical system 23 positioned at this imaging position, a Fresnel lens is provided in the transmissive 3-D display apparatus, and a Fresnel mirror is provided in the reflective 3-D display apparatus. The Fresnel mirror and Fresnel lens are such that the images of the two openings 22R and 22L are formed into images at pupil positions so that they can be observed by the observer placing his right and left eyes at these pupil positions. Because the Fresnel lens or mirror surfaces are placed at the imaging surface, the image quality does not deteriorate. In addition, unlike conventional concave mirrors, these surfaces are positioned on a flat, or only a slightly curved, substrate.

Figure 11:
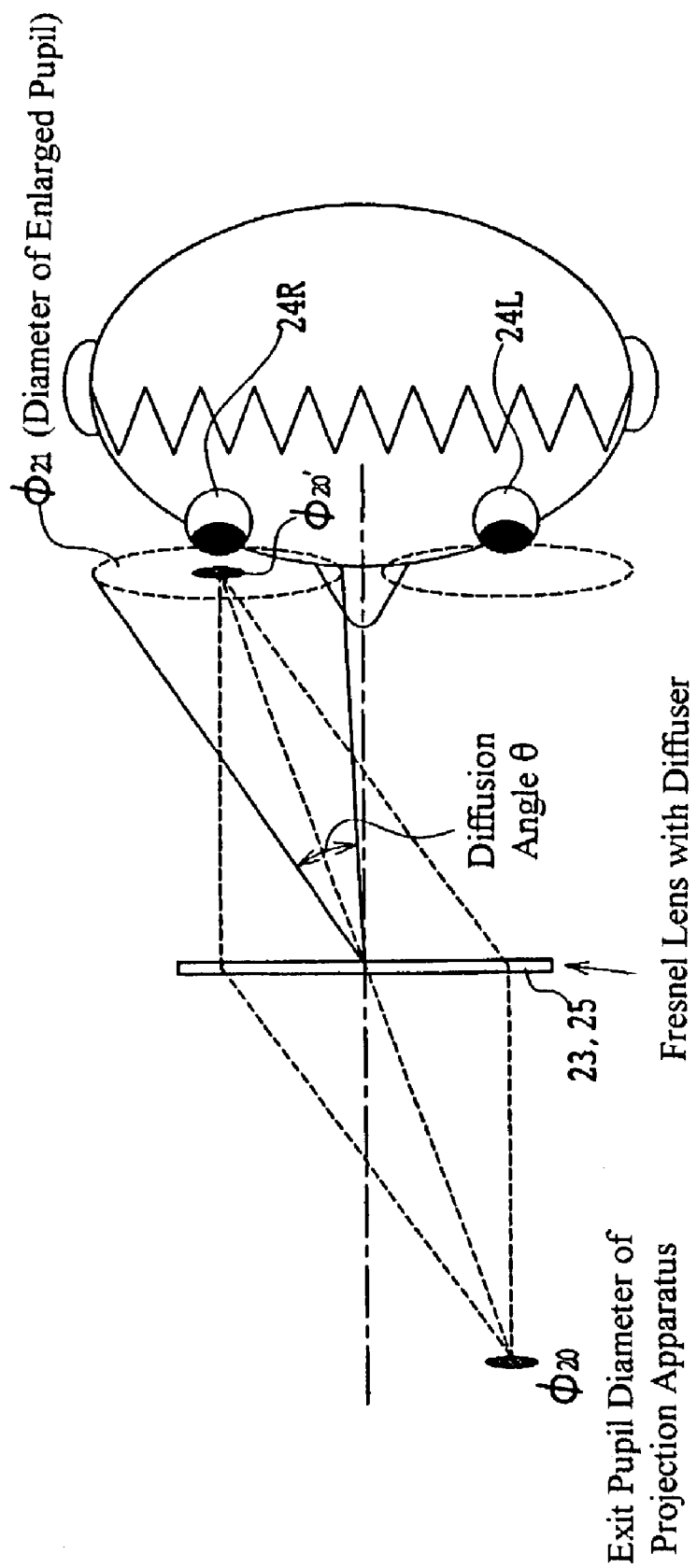
FIG. 11 illustrates how the observation pupils are enlarged when using the 3-D display apparatus of the present invention.

FIG. 11 illustrates how the observation pupils are enlarged when using the 3-D display apparatus of the present invention. In FIG. 11, a transmissive 3-D display apparatus is illustrated. At or near the display surface position, a diffusion optical system 25 is provided along with the imaging optical system 23. The imaging optical system 23 has the action of forming an image at the observation position such that the diameter $ø_{20}$ of the observation pupil (the exit pupil) from the right and left projection apparatuses becomes $ø_{20'}$ in size. The diffusion optical system 25 enlarges the diameter of the observation pupils from the right and left projection apparatuses that should be imaged at $ø_{20'}$ in size to $ø_{21}$ in size. The right and left observation pupils, as enlarged by the diffusion optical system 25, are set so as to not overlap so as to prevent cross-talk among the images intended for the right and left eyes of an observer.

The diffusion action of this diffusion optical system 25 acts only once in a transmissive 3-D display apparatus because the image passes only once through the diffusion optical system 25 provided at the display surface position, but acts twice in a reflective 3-D display apparatus because the image passes twice through the diffusion optical system provided at the display surface position.

Embodiment 2 of a 3-D Display Apparatus

Figure 12A:
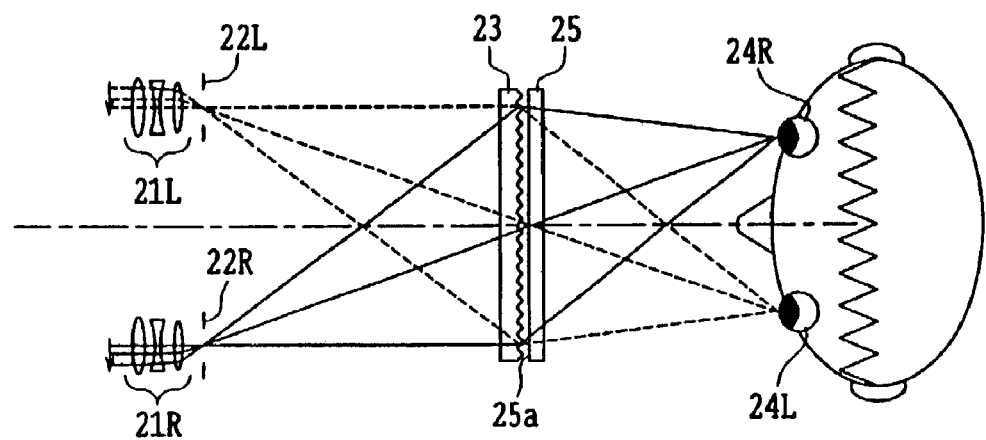
FIGS. 12(*a*) and 12(*b*) relate to another embodiment of a 3-D display apparatus according to the present invention, with FIG. 12(*a*) being a top view, and FIG. 12(*b*) being a side view.
Figure 12B:
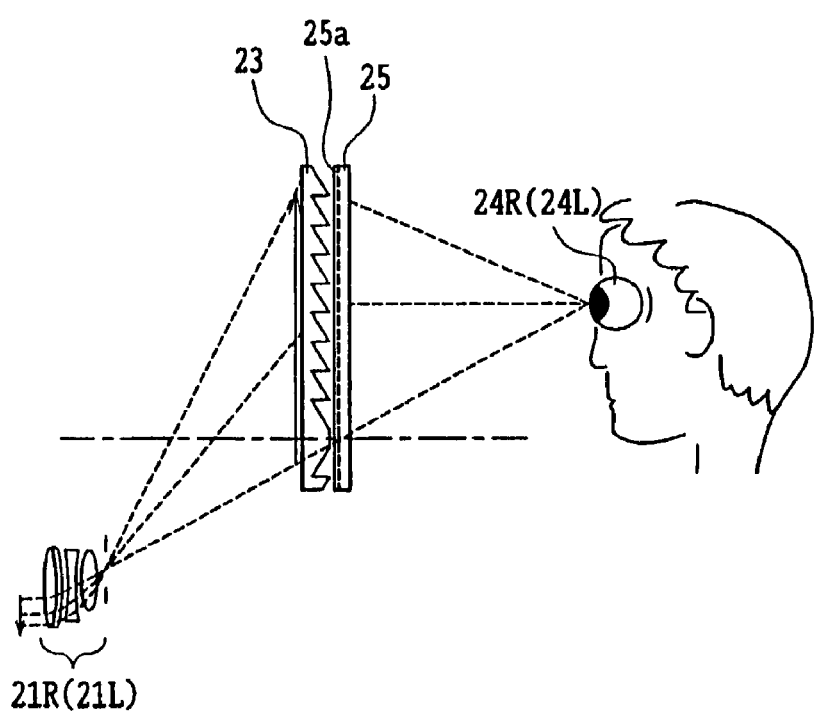

FIGS. 12(a) and 12(b) relate to another embodiment of a 3-D display apparatus according to the present invention, with FIG. 12(a) being a top view, and FIG. 12(b) being a side view. The 3-D display apparatus of this embodiment uses a transmissive-type display. At the display surface position, a Fresnel lens having its Fresnel surfaces on the observation side, is positioned as the imaging optical system 23 which creates an image of the openings 22R and 22L of the projection apparatus at the observer's pupils 24R and 24L. Near the Fresnel lens is positioned a diffuser as the diffusion optical system 25 for enlarging the observation pupils. Thus, a transmissive display panel is formed.

A diffusion surface 25a is provided on the Fresnel lens surface side of the diffusion optical system 25. In this embodiment, the Fresnel lens surfaces are positioned at the image position of the projection optical systems 21R and 21L. Consequently, there is no deterioration of image quality caused by the Fresnel lens surfaces. By the diffusion surface 25a being positioned near the Fresnel lens surfaces, blurring and deterioration of image quality is mitigated. In this embodiment, the transmissive display panel comprises a decentered optical system. That is to say, the Fresnel lens is decentered such that its optical axis is positioned below the center of the display panel surface, as shown in FIG. 12(b). The Fresnel lens has positive refractive power.

As shown in this embodiment, when using a decentered optical system, the display panel surface can be more narrow in width and thus can be more easily positioned so as not to be in the line of sight to the operation area. As shown in this embodiment, it is best to place the diffusion surface 25a and the Fresnel surfaces extremely close together at the image surface position of the projection optical systems 21R and 21L so that deterioration of image quality is minimized.

Embodiment 3 of a 3-D Display Apparatus

Figure 13A:
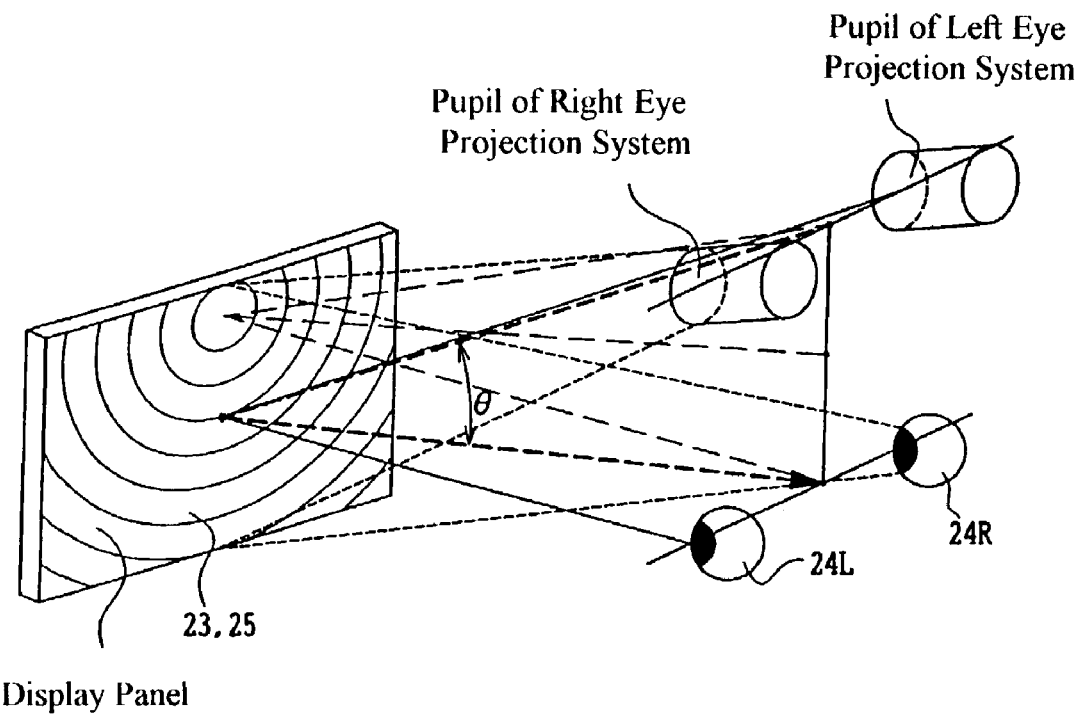
FIGS. 13(*a*) and 13(*b*) relate to still another embodiment of the 3-D display apparatus of the present invention, with FIG. 13(*a*) being a perspective view and FIG. 13(*b*) being a side view.
Figure 13B:
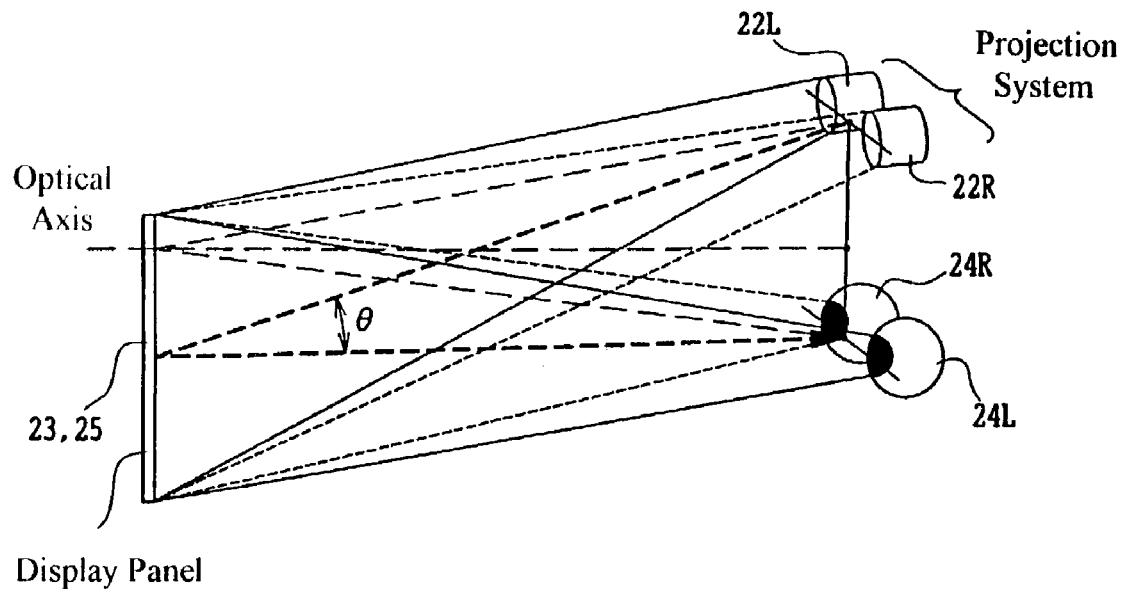

FIGS. 13(a) and 13(b) relate to still another embodiment of the 3-D display apparatus of the present invention, with FIG. 13(a) being a perspective view and FIG. 13(b) being a side view. The 3-D display apparatus of this embodiment is of the reflective type, and the display panel is provided with a Fresnel mirror 23 that is the imaging optical system for forming images of the openings 22R and 22L of the projection apparatus at observation pupils, and a diffusion optical system 25 for enlarging the observation pupils so that an observer can easily position his right and left eyes 24R, 24L within the enlarged observation pupils. In the case of a reflective 3-D display apparatus, it is necessary for each optical member to be positioned such that the projection apparatus and the observer's head do not interfere with each other. In addition, it is easiest for the observer to observe the display panel from the front.

Hence, with the present invention, an angle θ is maintained between the optical axis of the projection light incident on the center of the display panel, and the optical axis of the light rays exiting from the center of the display panel. In addition, the optical axis of the Fresnel mirror 23 is decentered in the vertical direction (upward in FIG. 13(a)) with respect to the center of the display panel.

Figure 14:
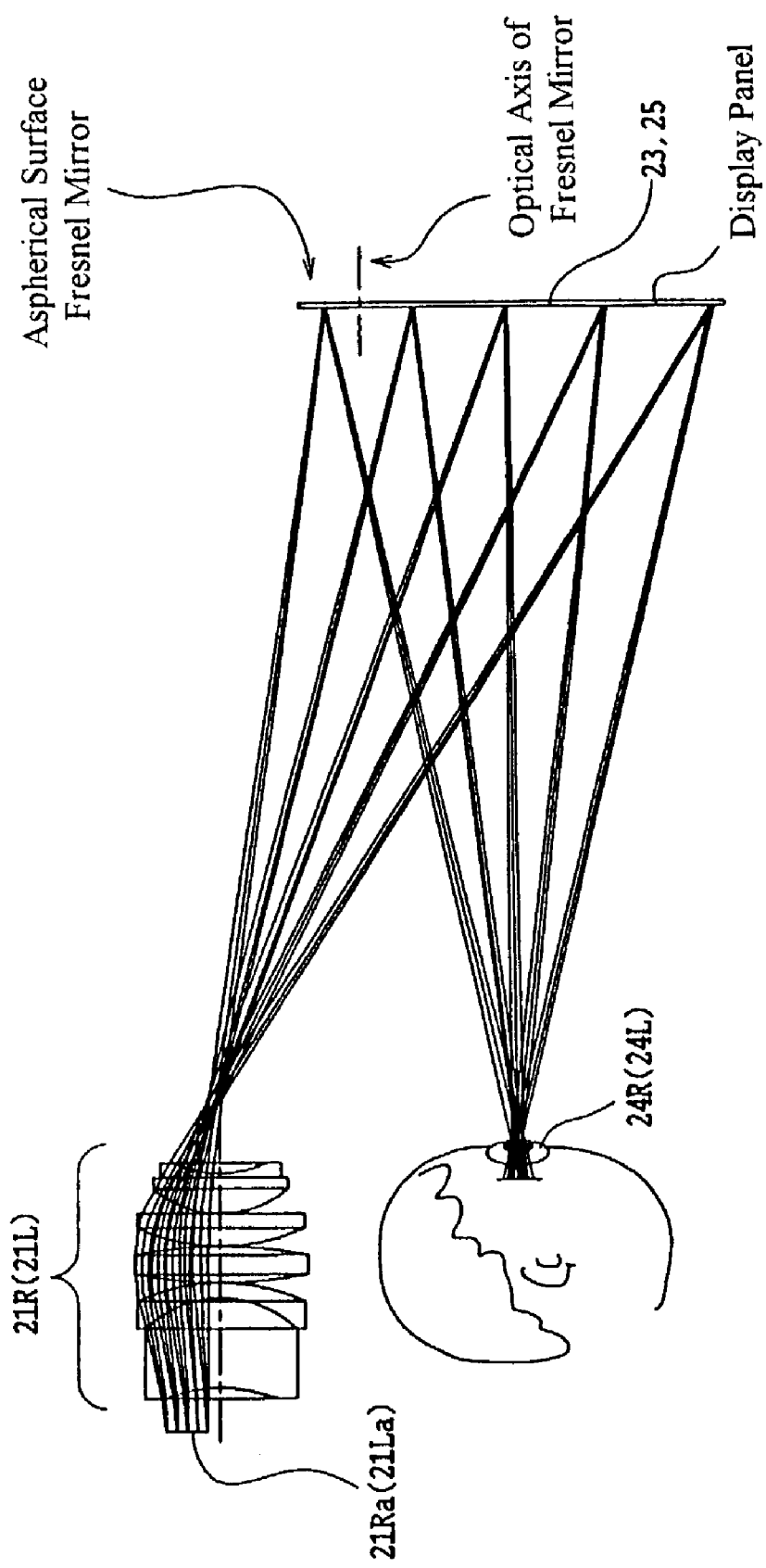
FIG. 14 is a side view showing, in more detail, the embodiment illustrated in FIG. 13.

FIG. 14 is a side view showing, in more detail, the embodiment illustrated in FIGS. 13(a) and 13(b). In this embodiment, a spherical lens system is used as the projection optical system 21R (21L) of the projection apparatus and the display element surfaces 21Ra (21La) are placed at a position decentered from the optical axis of the lens, and consequently the projection apparatus and the observer's head do not interfere with each other.

The display panel is placed orthogonal to a line drawn mid-way between the observer's eyes and the display panel, and an aspherical Fresnel mirror is used in the display panel surface. As described above, it is preferable that the observer has a frontal view of the display panel, but in the present embodiment, the display panel can be used even from a position tilted ±30°, and if the inclination is around ±15°, a good quality image can still be obtained.

FIGS. 15(a)–15(c) show possible minor variations, as viewed from the side, of the embodiment illustrated in FIGS. 13(a), 13(b), and 14. In FIGS. 15(a)–(c), the line of vision of the observer is fixed in the horizontal direction. In this embodiment, the positions of the display panel and the observer's pupils 24R (24L) are adjusted by a combination of the angle of inclination of the display panel surface and the amount of decentering of the optical axis of the decentered Fresnel lens surface having the imaging action of the display panel surface, so that observation is possible under optimum conditions. The projection optical systems 21R (21L) are positioned orthogonal to the display panel surface. In these figures, a support arm 27 supports the two projection apparatuses and the display panel. The angle of inclination α of the display panel surface is an angle formed between the lines connecting the center of the display panel and the observer's pupil, and the perpendicular line from the center of the display panel. It is preferable for this angle to be not more than ±30°, for ease of viewing.

The 3-D display apparatus of FIG. 15(a) is such that the angle of inclination α of the display panel surface is 0°. The 3-D display apparatus of FIG. 15(b) is such that the angle of inclination α(+) of the display panel surface is less than or equal to 30°. The arrangement shown in FIGS. 15(a) or 15(b) offers advantages over the arrangement shown in FIG. 15(c), in terms of natural ease of viewing and the small amount of decentering needed for imaging.

Figures 16A, 16B:
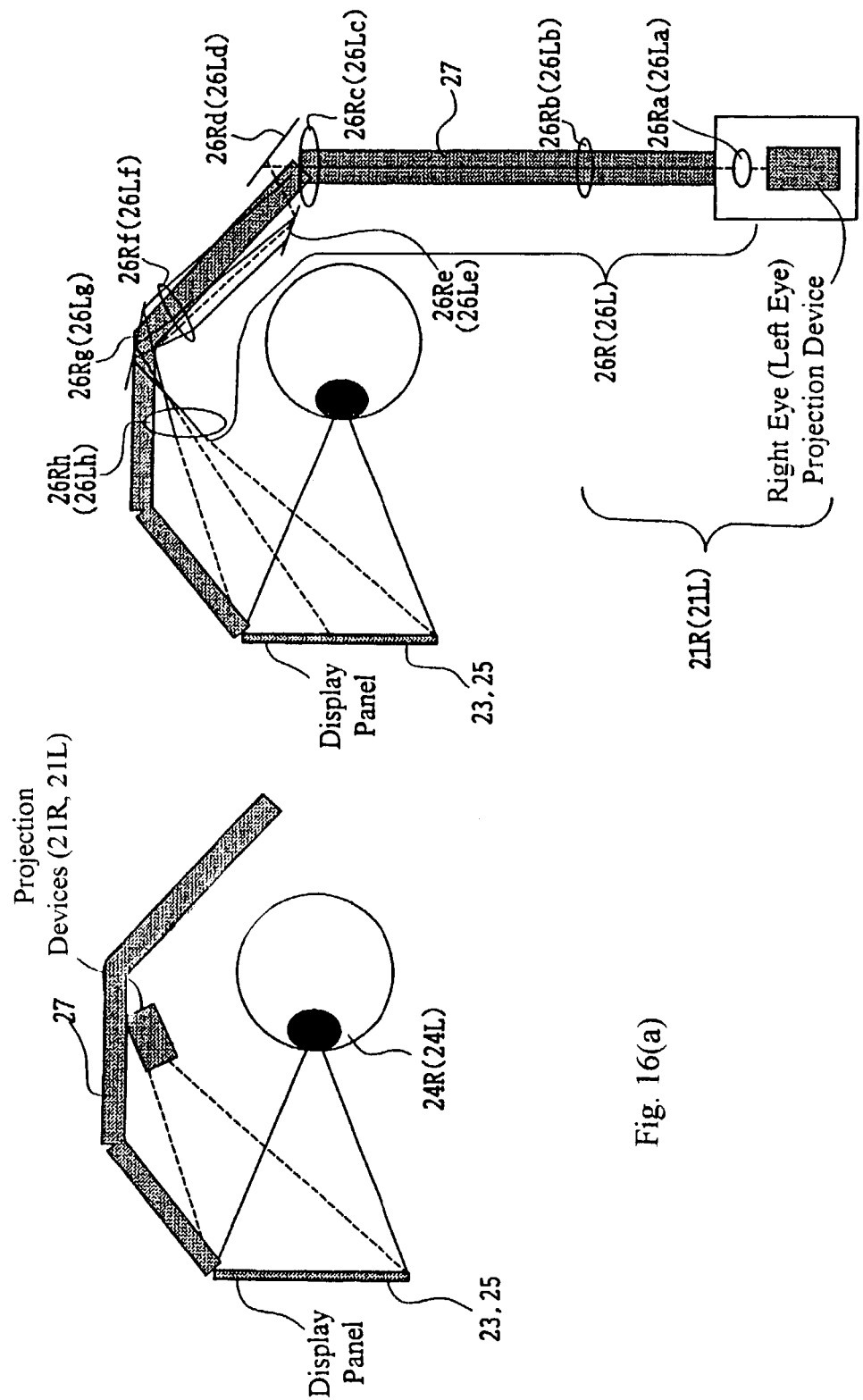
FIGS. 16(*a*) and 16(*b*) show other possible variations, as viewed from the side, of the 3-D display apparatus of the present invention.

FIGS. 16(a) and 16(b) show other possible variations, as viewed from the side, of the 3-D display apparatus of the present invention. The 3-D display apparatus in these figures is of the reflective type.

The 3-D display apparatus of FIG. 16(a) is provided with two projection devices (21R, 21L) and is also provided with a diffusion optical system 25 and a Fresnel mirror 23 as a display panel, so as to form enlarged and separated right and left images of the observation pupils at the position of the observer's eyes. The 3-D display apparatus of FIG. 16(b) is formed of the projection optical systems 21R(21L) of FIG. 16(a) with a relay system added. That is to say, a projection apparatus is provided, along with relay systems 26R(26L) inside the support arm 27 that supports the display panel. In the example illustrated in FIG. 16(b), the relay systems 26R(26L) are composed of lenses 26Ra–26Rc (26La–26Lc), mirrors 26Rd–26Re (26Ld–26Le), lenses 26Rf(26Lf), mirrors 26Rg(26Lg) and lenses 26Rh(26Lh). By forming the system in this manner, it is possible to create a sufficient distance between the projection apparatus and the observer so as to avoid interference between the projection apparatus and the observer.

Next, another example of a display panel of the 3-D display apparatus used in the 3-D observation apparatus of the present invention will be described.

Figures 17A, 17B:
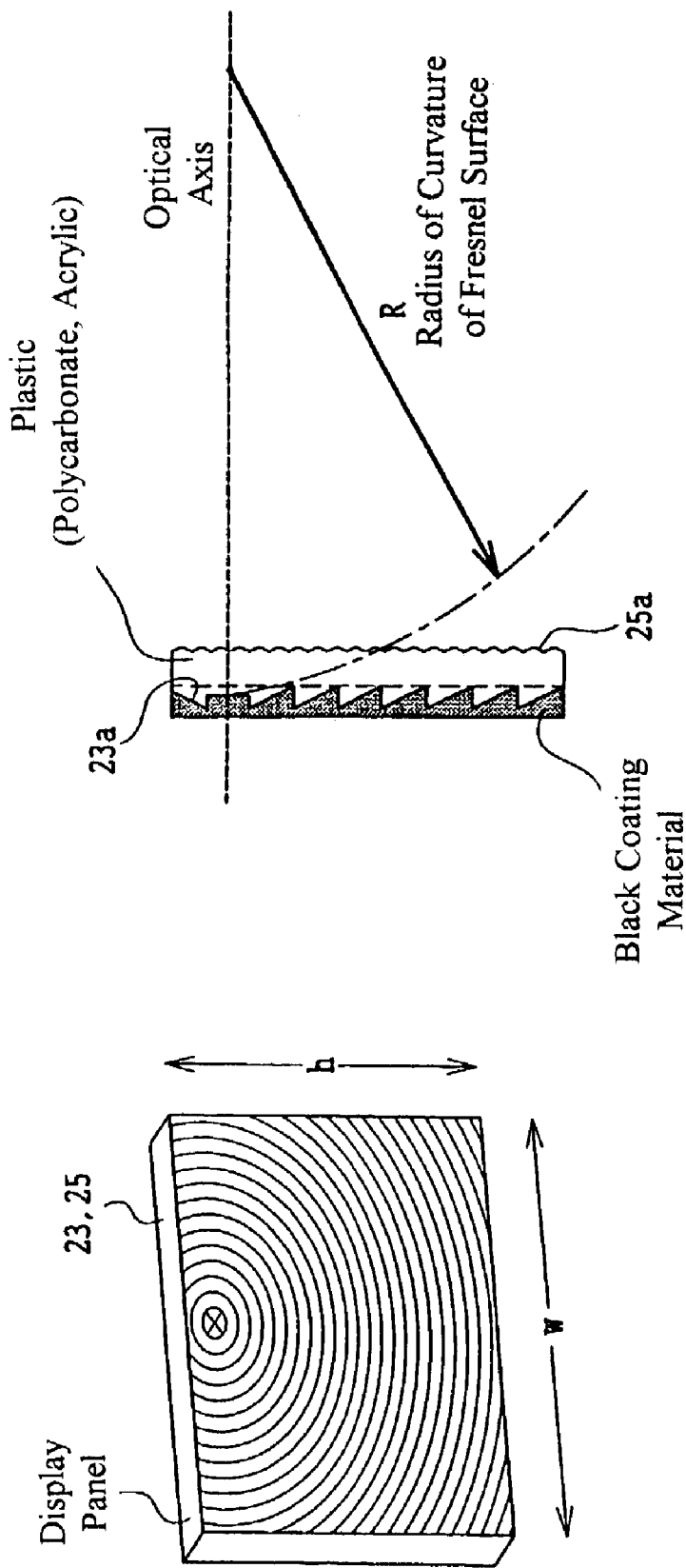
FIGS. 17(*a*) and 17(*b*) illustrate one embodiment of a reflective 3-D display panel that can be used with the 3-D display apparatus of the present invention, with FIG. 17(*a*) being a perspective view and FIG. 17(*b*) being a side view.

FIGS. 17(a) and 17(b) illustrate one embodiment of a reflective 3-D display panel that can be used with the 3-D display apparatus of the present invention, with FIG. 17(a) being a perspective view and FIG. 17(b) being a side view. The display panel of the present embodiment is composed of a single body comprising a Fresnel surface 23a and a diffusion surface 25a in which wave-patterns are randomly arranged.

Specifically, plastic resin such as polycarbonate or acrylic, for example, are formed into a single unit by a Fresnel surface mold and a mold for concave surfaces, arranged randomly for the diffusion action, being pressed together from both sides. Following this, aluminum is coated as a reflective film on the Fresnel surface 23a, and on top of this film a black coating is formed as a protective film. Moreover, the Fresnel surface 23a of the display panel has the function of forming images of the images of the openings of the two projection apparatuses at the position of the observer's pupils, and the diffusion surface 25a has the function of enlarging the observation pupils.

The display panel of this embodiment is shown in FIGS. 17(a) and 17(b) and is formed of a decentered, Fresnel, rear-surface mirror.

The equation for the radius of curvature R of a Fresnel surface 23a as a function of focal length is different depending on whether a front surface mirror or a rear-surface mirror is considered. In the case of a rear-surface mirror $$R = 2n \cdot f \qquad \text{Equation (1)}$$

and, in the case of a front surface mirror $$R = 2 \cdot f \qquad \text{Equation (2)}$$

where n is the index of refraction and f is the focal length.

As a result of the above relationships, for a given focal length, the radius of curvature R will be larger for a rear-surface mirror than for a front surface mirror. Because the present embodiment uses a rear-surface mirror, the radius of curvature is large and this configuration is advantageous in reducing aberrations during pupil imaging.

Furthermore, with the display panel of the present embodiment, the Fresnel surface 23a is composed of an aspherical Fresnel surface, the radius of curvature of which is larger toward the periphery of the Fresnel surface 23a. By using an aspherical Fresnel, rear-surface mirror 23a, it is possible to keep aberrations that occur in the observation pupils even smaller.

FIGS. 18(a) and 18(b) show another embodiment of a reflective 3-D display panel that can be used with the reflective 3-D display apparatus of the present invention, with FIG. 18(a) being a side view, and FIG. 18(b) being an enlarged diagram that shows the fine detail of a diffusing pattern that is superimposed on the Fresnel surfaces. Thus, the display panel of this embodiment, rather than being provided with a diffusion surface 25a as an adjacent optical material that transmits light as in FIG. 17(b), instead has the Fresnel surface 23a itself figured with minute concave structures 25b (similar to random wave patterns) which act to diffuse the light that is reflected at the Fresnel surface 23a, as illustrated in FIG. 18(b). By coating the Fresnel surface 23a with a reflective film, the structure of FIG. 18(b) functions as a diffusing, rear-surface Fresnel reflective mirror. In addition, this embodiment is advantageous in that the upper surface of the display panel is smooth, enabling it to be easily coated with an anti-reflection film so as to minimize light that is reflected by the upper surface of the display panel.

With a reflective display panel such as the one shown in FIG. 17(b), light passes through the diffusion surface twice. On the other hand, with a reflective display panel of the present embodiment as shown in FIG. 18(b), both the Fresnel surface 23a having an imaging action and the minute concave surfaces 25b having a diffusion action are both formed on the same rear surface, and projection light passes through the diffusion surface only once so the diffusion action is received only once, and consequently blurring of this light is not likely to occur and it is possible to mitigate deterioration of image quality.

Figure 19:
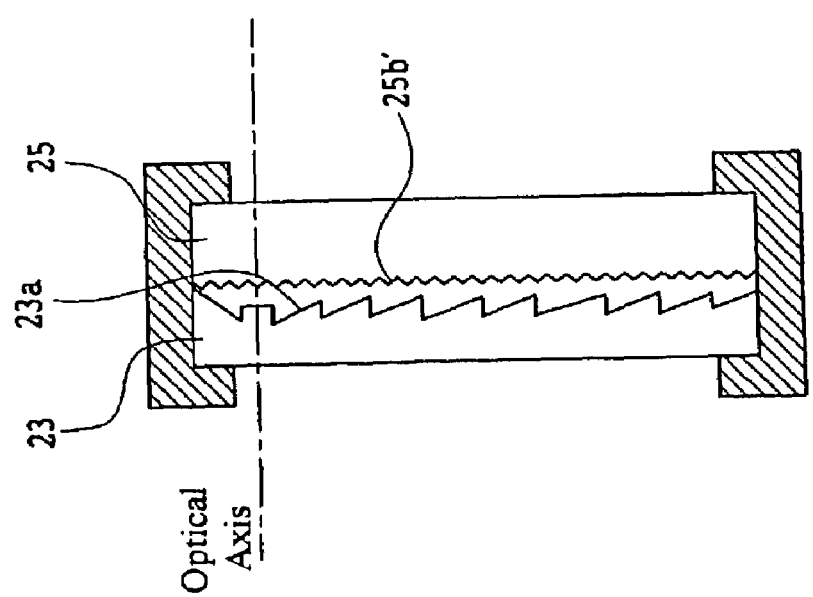
FIG. 19 is a side view of another embodiment of a reflective 3-D display panel that can be used with the reflective 3-D display apparatus of the present invention.

FIG. 19 is a diagram of another embodiment of a reflective 3-D display panel, as viewed from the side, that may be used with the reflective 3-D display apparatus of the present invention. In the display panel of this embodiment, minute concave structures 25b' are provided which are positioned immediately adjacent the Fresnel mirror 23a at an interface between two surfaces. These structures are on the same side of the Fresnel mirror 23a as the illumination source and the viewer. This makes the blurring of images that are projected onto the reflective 3-D display panel by light which twice passes through the diffusion surface acceptably small, though not as small as in the embodiment shown in FIG. 18(b).

Figure 20:
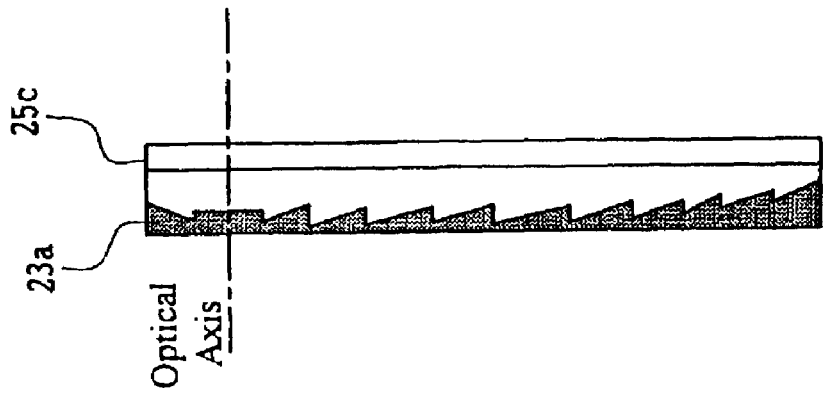
FIG. 20 is a side view of another embodiment of a reflective 3-D display panel that can be used with the reflective 3-D display apparatus of the present invention.

FIG. 20 is a diagram of another embodiment of a reflective 3-D display panel, as viewed from the side, that may be used with the reflective 3-D display apparatus of the present invention. The display panel of this embodiment is formed of a diffusive film 25c that is pasted onto a surface of the decentered Fresnel rear-surface mirror in lieu of using the surface 25a (as in the embodiment illustrated by FIG. 17(b)). The diffusive film 25c may be either of an internal diffusion design, or where diffusion is achieved by indentations formed on the surface.

Figure 21C:
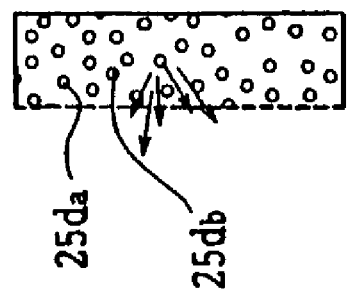
FIGS. 21(*a*)–21(*c*) relate to another embodiment of a reflective 3-D display panel that can be used with the reflective 3-D display apparatus of the present invention, with FIG. 21(*a*) being a side view of the 3-D display panel, FIG. 21(*b*) being a side view of a variation on the structure illustrated in FIG. 21(*a*), and FIG. 21(*c*) showing the diffusion structure inside the display panel.
Figure 21B:
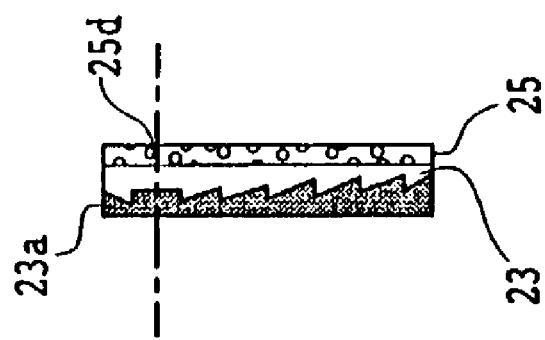
Figure 21A:
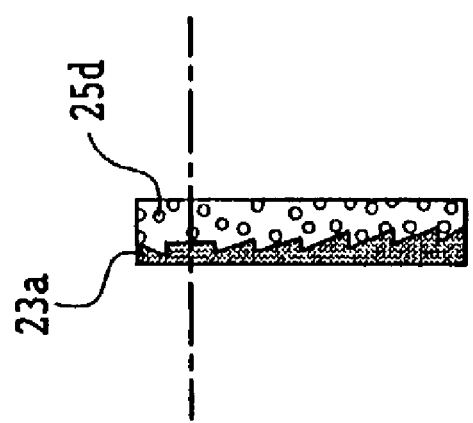

FIGS. 21(a)–21(c) show other embodiments of reflective 3-D display panels that can be used with the reflective 3-D display apparatus of the present invention, with FIG. 21(a) being an embodiment of a reflective display panel as viewed from the side, FIG. 21(b) being a variation on the embodiment shown in FIG. 21(a), and FIG. 21(c) illustrating the diffusion structure inside these display panels. In these embodiments, the diffusion member diffuses light internally within a transparent material. The internally diffusive diffusion member is formed by mixing transmissive microparticles 25da, 25db, etc., having different refractive indices, in plastic so that light is diffused when passing through these microparticles as shown in FIG. 21(c).

The display panel of FIG. 21(a) is formed by mixing microparticles and plastic with an optical member so as to form an internally diffusive diffusion plate which is then bonded or affixed to a decentered Fresnel rear-surface mirror having a Fresnel surface 23, so that the decentered Fresnel rear-surface mirror and the internally diffusive diffusion plate form a single unit.

The display panel of FIG. 21(b) is formed by bonding together, or placing close to each other, a decentered Fresnel rear-surface mirror and an internally diffusive diffusion plate. In the composition shown in FIG. 21(b), in lieu of using an internally diffusive diffusion plate, it is also possible to use an internally diffusive diffusion film.

Figure 22C:
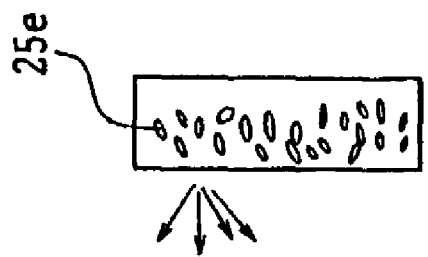
FIGS. 22(*a*)–22(*c*) relate to another embodiment of a reflective 3-D display panel that can be used with the reflective 3-D display apparatus of the present invention, with FIG. 22(*a*) being a side view of the 3-D display panel, FIG. 22(*b*) being a side view of a variation on the structure illustrated in FIG. 22(*a*) and FIG. 22(*c*) showing the diffusion structure inside the display panel.
Figure 22B:
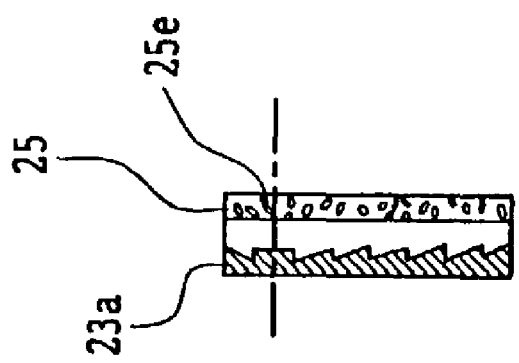
Figure 22A:
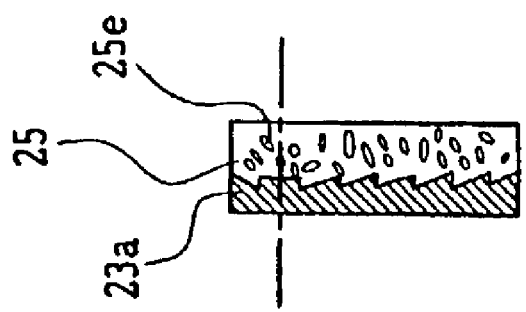

FIGS. 22(a)–22(c) show other embodiments of a reflective 3-D display panel that can be used with the reflective 3-D display apparatus of the present invention, with FIG. 22(a) being an embodiment of a reflective display panel as viewed from the side, FIG. 22(b) being a variation on the embodiment shown in FIG. 22(a), and FIG. 22(c) illustrating the diffusion structure inside these display panels. The display panel of these embodiments use, as a diffusion member 25, an internal diffusion display panel that employs polymer liquid crystal 25e. When polymer liquid crystal is used, it can be stabilized, and the polymer liquid crystal 25e exhibits birefringence. When optically polymerized, the liquid crystal is stabilized in a randomly oriented state internally, as shown in FIG. 22(c). In the display panel shown in FIG. 22(a), the optical member that is provided with a Fresnel surface 23a (i.e., a decentered Fresnel rear-surface mirror) is covered using polymer liquid crystal 25e.

The display panel shown in FIG. 22(b) is formed of a decentered Fresnel rear-surface mirror that is bonded to, or positioned nearby, a diffusion plate formed of polymer liquid crystal. In lieu of using a diffusion plate formed of polymer liquid crystal, a diffusive film that is made of a polymer liquid crystal may be used. With the display panel of the present embodiment, the polymer liquid crystal 25e which exhibits birefringence is stabilized in a randomly oriented state. Consequently, light received is refracted only slightly in the direction of polarization. Furthermore, the diffusion of light is caused by internal scattering within the polymer liquid crystal layer as a whole. Moreover, with the display panel of the present embodiment, it is possible for the outer surface to be planar since the dispersion is achieved internally. Thus, it is easier to wipe the device clean when it becomes soiled and, in addition, it is easier to attach an anti-reflection film to prevent unwanted reflections from the top surface of the mirror.

A holographic optical element may be used, as one example, to form the diffusion plate 25. The holographic optical element may either be a transmission hologram or a reflection hologram. It is generally known that a transmission hologram that is recorded within a volume sensitive material has a lower wavelength sensitivity than does a reflection hologram. When used with the projection display apparatus of the present invention for displaying a color image, because it is necessary to record three holographic interference patterns in order to diffuse the light at three wavelengths, namely, R (red), G (green) and B (blue), it is preferable that a transmission hologram be used due to its comparatively lower wavelength selectivity. A description is provided hereinafter of a display panel that employs a concave Fresnel mirror with a transmission hologram for the diffusion plate 25, as described above. However, the description will discuss only one side, from among the right and left sides of the optical system, with the description of the other side being omitted.

Figure 23A:
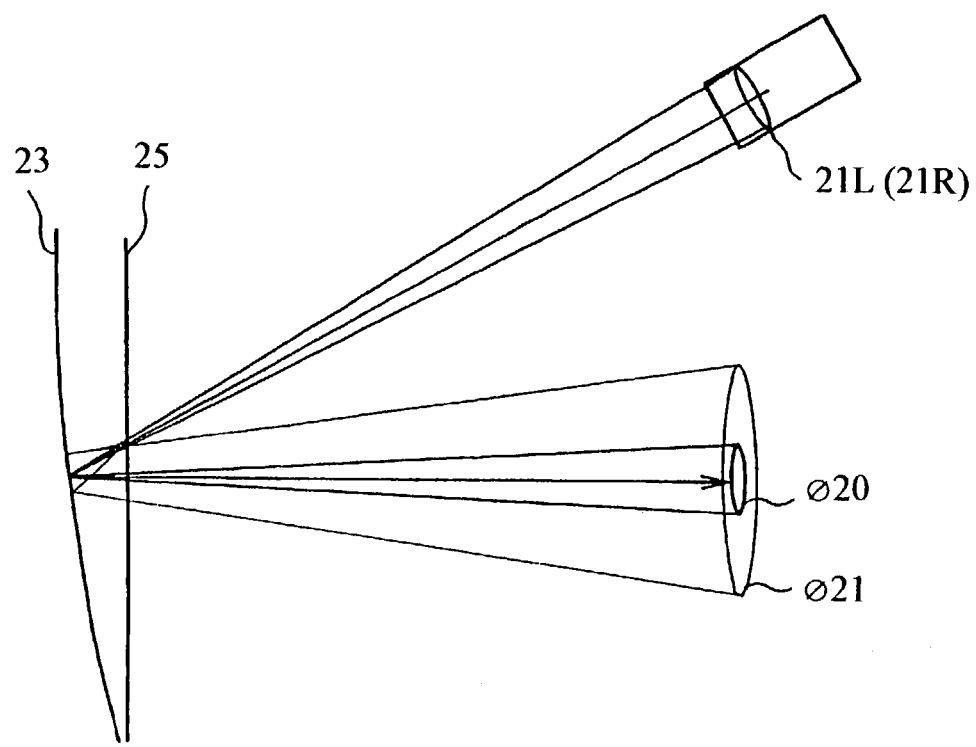
FIGS. 23(*a*) and 23(*b*) relate to another embodiment of a reflective 3-D display panel that uses a holographic optical element as a dispersion means of a 3-D display panel that can be used with the 3-D display apparatus of the present invention, with FIG. 23(*a*) being a side explanatory diagram and FIG. 23(*b*) showing the display panel in use.
Figure 23B:
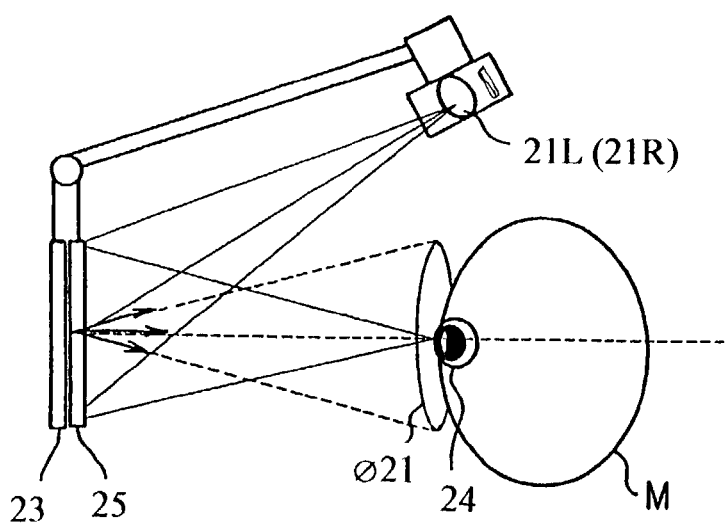

FIG. 23(a) shows a display panel that employs a concave Fresnel mirror 23 and that uses, for the diffusion plate 25, a transmission hologram arranged in the vicinity of the projected image. FIG. 12(b) is a side view of a projection display apparatus that employs such a display panel. Referring to FIG. 23(b), a projection optical system 21L (21R) projects an image onto the display panel having a transmission hologram 25 arranged in the vicinity of the projected image. The display panel is a Fresnel mirror 23 which forms exit pupils for the projection optical system at prescribed positions. When an eye 24 of an observer M is placed at an exit pupil of the projection optical system, that eye can see images that are displayed on the display panel by the projection display apparatus. Referring to FIG. 23(a), the exit pupil ø20 that is formed by the Fresnel mirror 23 is increased in size by way of the diffusion plate 25 to an exit pupil ø21, with the size of the exit pupil ø21 being sufficiently large for easy observation by the observer, but without the exit pupils for the right and left eyes overlapping. Thus, even if the positions of the eyes 24L (24R) of the observer M are slightly misplaced from the ideal viewing positions, the observer will be able to view the displayed images. When the display panel is a reflection-type panel, the light arriving at the position of the exit pupil ø21 from the projection optical systems 21L (21R) passes through the diffusion plate 25 a total of two times. However, because the diffusion plate in this case is a holographic optical element, and the incidence angles of the light onto the transmission hologram are different for the two passes, the diffusion effect of the transmission hologram will occur only once, namely, when the incident light corresponds in incidence angle and wavelength to the reference beam used to form the transmission hologram.

In the case of observing projected images having a binocular parallax such as in a 3-D display apparatus, if the diffusion angle becomes too large, the left eye will be able to observe images intended for the right eye, and vice-versa. When this occurs rather than a stereoscopic image being observed, instead, a double-image is seen. Therefore, the diffusion angle of the diffusion plate 25 having a transmission hologram is preferably below 8° (full width, measured at the half-maximum). Additionally, it is also preferable that the diffusion angle be less than or equal to 12° (full width, measured at $\frac{1}{10}$ maximum), and that a minimum amount of light that is diffused more than 12° reach the observer. Therefore, when the diffusion plate 25 is formed from a transmission hologram, the diffused light intensity as a function of diffusion angle should rapidly decrease from the full width diffusion angle as measured at the half-maximum intensity points.

Figure 24A:
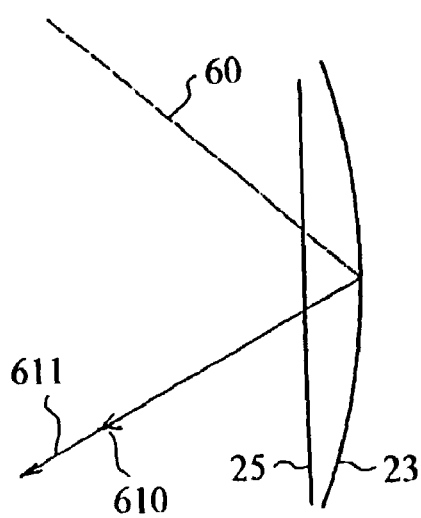
FIGS. 24(*a*)–25(*b*) are explanatory diagrams which are used to explain the dispersion and bending (diffraction) effect of the holographic optical element used in the display panel embodiment of FIGS. 23(*a*) and 23(*b*)

A description of the relationship between wavelength dispersion and the bending (diffraction) action of the diffusion plate 25 when the diffusion plate is formed of a transmission hologram follows, and of the placement relationship of the diffusion plate 25, when formed of a transmission hologram and of the concave Fresnel mirror 23. As is well known in the art, a transmission hologram diffusion plate is made by recording the interference pattern between a reference beam and object light from a diffused light source (a secondary light source). When the interference pattern between a reference beam and a diffused light source is recorded for a transmission hologram, with both being on the same axis (in-line placement) and on one side of the recording material, then the center light ray of the light beam 60 (FIG. 24(a)) from the projection optical system 21L (21R) initially enters into the diffusion plate 25 and passes directly through without being bent (diffracted) by the diffusion plate 25, as shown in FIG. 24(a). This light is often referred to as the "zero-order light". Furthermore, after the light beam 60 has passed through the hologram, the ray directions are changed upon being reflected by the concave Fresnel mirror 23. These reflected light rays will then re-enter into the diffusion plate 25, but this time they are incident on the rear side. If the angle of incidence satisfies the reconstructed light incident angle (i.e., the angle where the diffraction efficiency approaches its peak) of the transmission hologram, then the light (other than the zero order light) ray will be diffused by way of diffraction. On the other hand, if the angle of incidence of the incident light at the time of the second incidence satisfies the reconstructed light incidence angle, then the main light beam 60 at the time of the first transmission passes virtually directly through without diffraction, and the light around the center light ray that passes through at the time of the second transmission will be dispersed. In either case, the zero-order light 610 and the main light beam 611 proceed in the same direction. FIG. 24(a) shows these elements but the diffused light is not shown. In this drawing, only the central light ray 611 from among the diffused light being diffracted and the zero-order light 610 that is not diffracted by the diffusion plate 25 are shown. The zero-order light 610 and center ray of the main light beam 611 proceed in the same direction and arrive at the center of the exit pupil ø21 of the projection display device. Accordingly, as shown in FIG. 24(a), a case wherein the diffusion plate 25 formed of a transmission hologram has only a diffusion action and does not have a bending action on the optical path, not only the diffused light but also the zero-order light 610 arrives at the exit pupil ø21. The undesirable result is that a spot can be seen for the zero-order light 610 in the center of the projected image being observed.

Figure 24B:
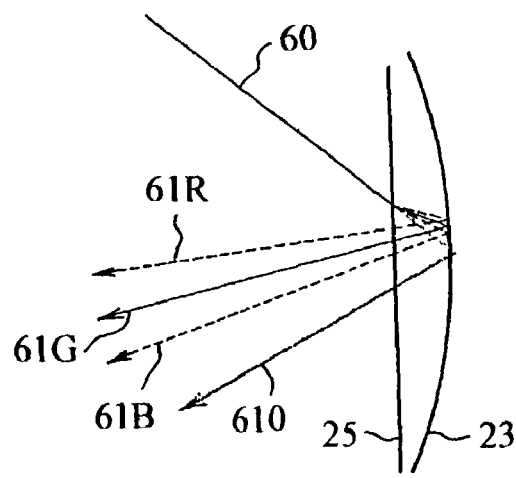
Figure 24C:
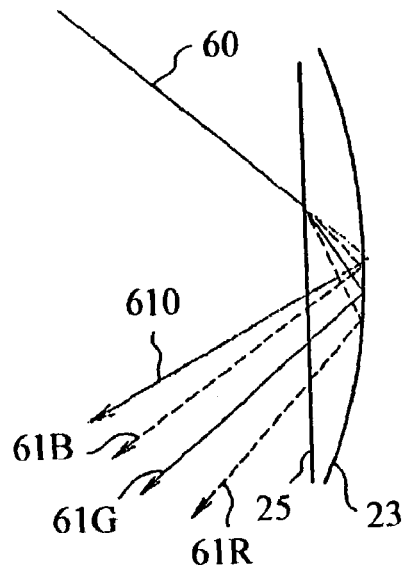
Figure 25A:
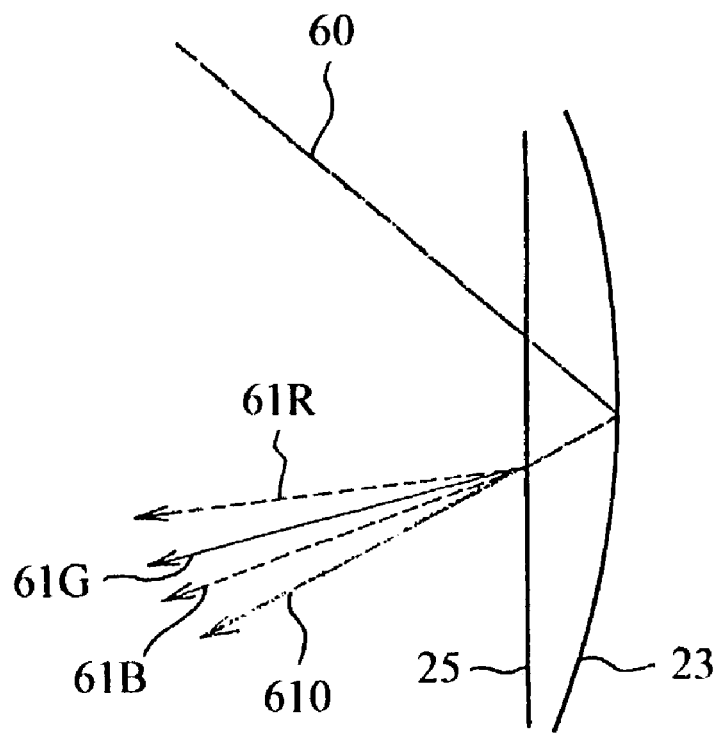
Figure 25B:
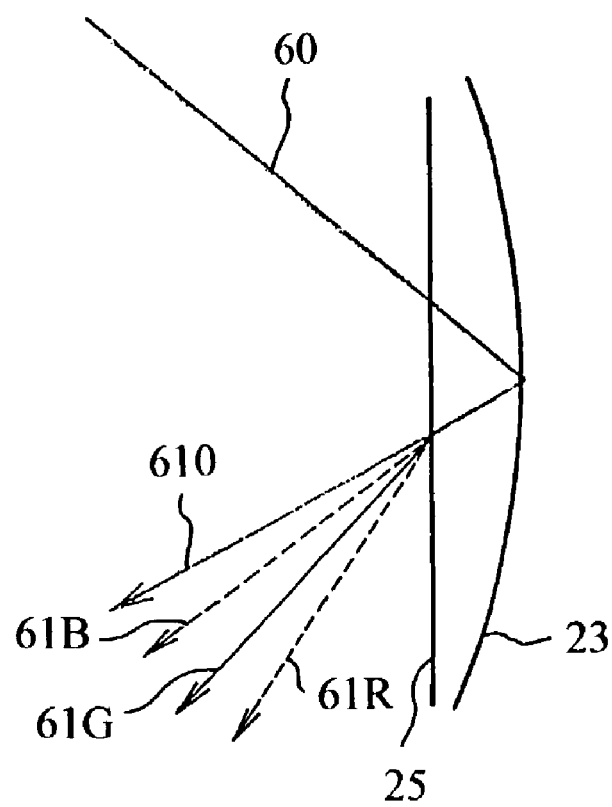

For this reason, a diffusion plate 25 formed of an off-axis, transmission hologram is preferably used. With such a diffusion plate, a bending of the light beam together with wavelength dispersion occurs when the incident light satisfies the wavelength and incidence angle of the beam used to construct the transmission hologram. FIGS. 24(b) and 24(c) show the case where the incident light satisfies the wavelength and incidence angle of the beam used to construct the transmission hologram upon first incidence; and FIGS. 25(a) and 25(b) show the case where the incident light satisfies the wavelength and incidence angle of the beam used to construct the transmission hologram at second incidence. FIG. 24(b) and FIG. 25(a) illustrate the diffraction angle being toward the normal to the surface; and FIG. 24(c) and FIG. 25(b) illustrate the diffraction angle being away from the normal to the surface. In each drawing, the indication of the diffused light other than the central ray is omitted. Thus, only the central rays, of the diffused beams of wavelengths R, G, B that are diffracted by the diffusion plate 25, are shown by 61R, 61G, and 61B, respectively. As is evident from each of the drawings, when using a transmission hologram having a bending action on the light beam at the diffusion plate 25, it becomes possible to separate the zero-order light 610 that is not diffracted by the hologram from the diffracted beams 61R, 61G and 61B. As a result it is possible to provide a construction wherein the zero order light is not visible from the exit pupil ø21 of the projection display apparatus. More specifically, a construction is preferred wherein the positioning of the exit pupil ø21 of the projection display device is such that the zero-order light 610 enters after being separated by at least one-half the pupil diameter from the center of the exit pupil ø21.

Figure 26A:
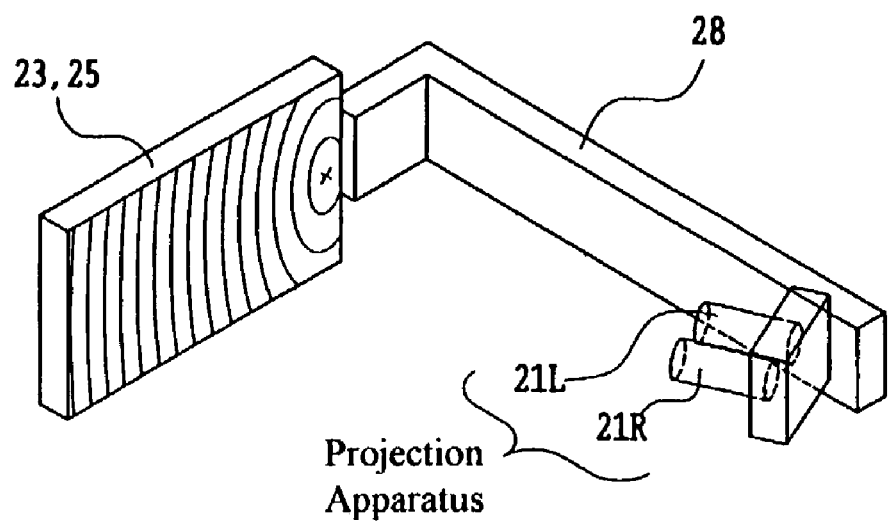
FIGS. 26(*a*) and 26(*b*) relate to the positioning of a reflective 3-D display apparatus that can be used according to any of the disclosed embodiments, with FIG. 26(*a*) being a perspective view and FIG. 26(*b*) being a top view.
Figure 26B:
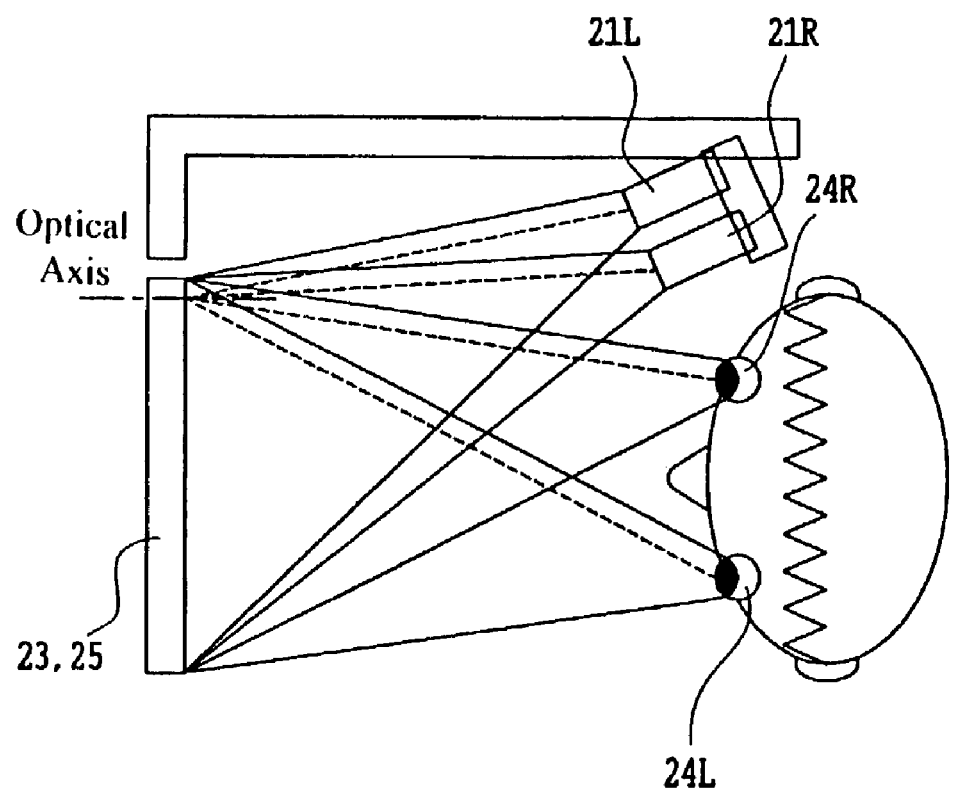

FIGS. 26(a) and 26(b) show the arrangement of the reflection-type 3-D observation apparatus of the present invention, with FIG. 26(a) being a perspective view and FIG. 26(b) being a top view. In the 3-D observation apparatus of this embodiment, the display panel is of the reflection-type. The display panel 23,25 and two projection devices 21L, 21R are integrally attached to a supporting member 28. The two projection devices 21L, 21R may be positioned on either the right or left side of the display panel 23,25, but for convenience of illustration are shown as positioned on the right side in FIGS. 26(a) and 26(b). The Fresnel reflecting surface of the display panel has its optical axis de-centered with respect to the center of the display surface. The de-centering may be either to the right or left, but for convenience of illustration is illustrated as being to the right in FIGS. 26(a) and 26(b). A sufficient angle is provided between the optical axis of the light entering the center of the display panel from the right and left projection devices versus the optical axis of the light emerging from the display panel to the viewer's respective right or left pupils 24R (24L) so that the projection devices and the viewer's head do not interfere with each other.

Figure 27:
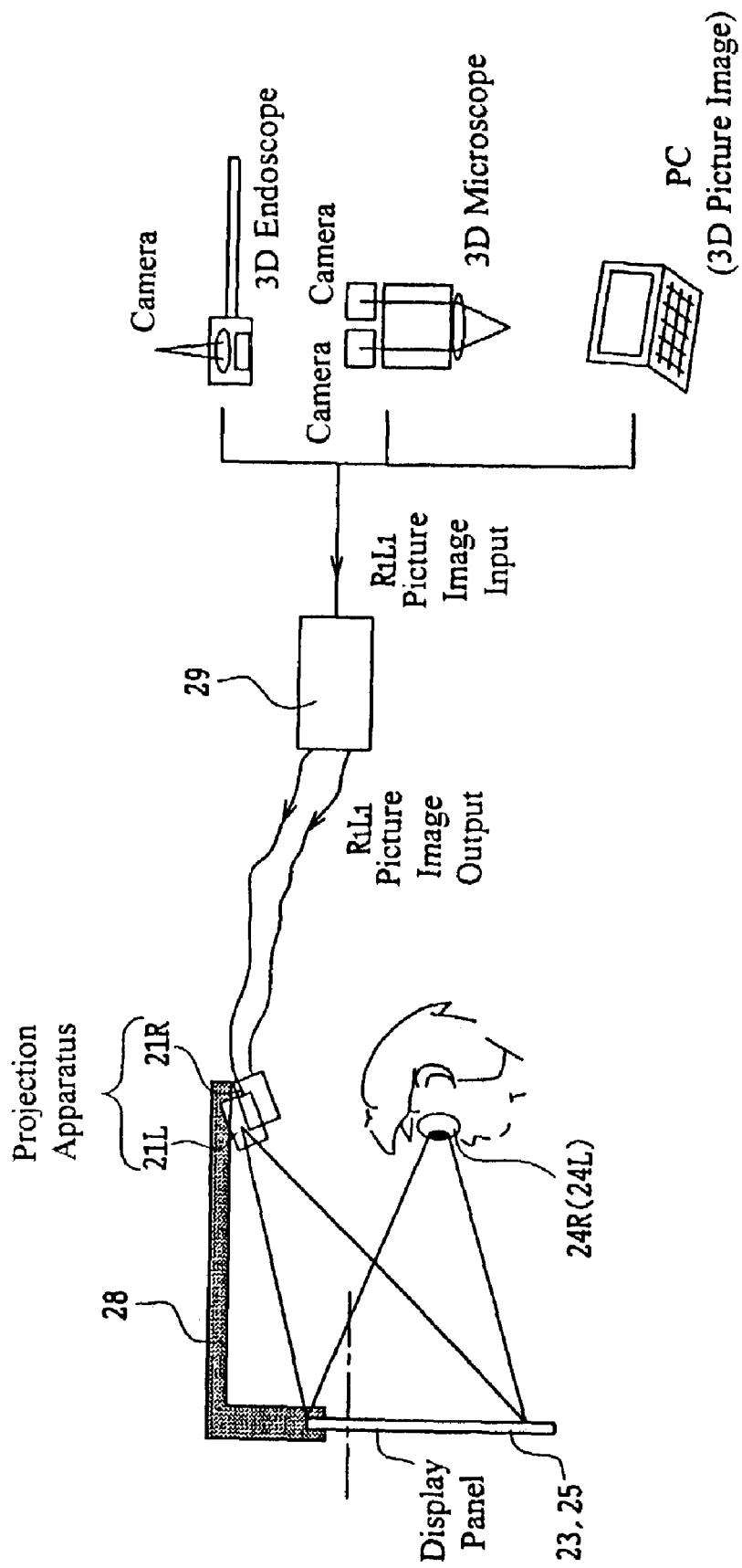
FIG. 27 shows an embodiment of a 3-D observation system that uses a 3-D display apparatus according to the present invention.

FIGS. 27 illustrates an embodiment of a 3-D observation system using the 3-D display apparatus of the present invention. In this embodiment, the right and left projection apparatuses are connected to a projection control apparatus 29. The projection control apparatus 29 is made so that images photographed by right and left cameras provided in a 3-D image input apparatus, are then sent to the right and left projection apparatuses and are displayed. In this embodiment, the projection control apparatus 29 can be configured so that a 3-D image having parallax and created by a personal computer can be projected and viewed by an observer, just as any other selectively input image.

Next, an embodiment of a product to which the 3-D display apparatus of the present invention has been applied will be described.

Figure 28:
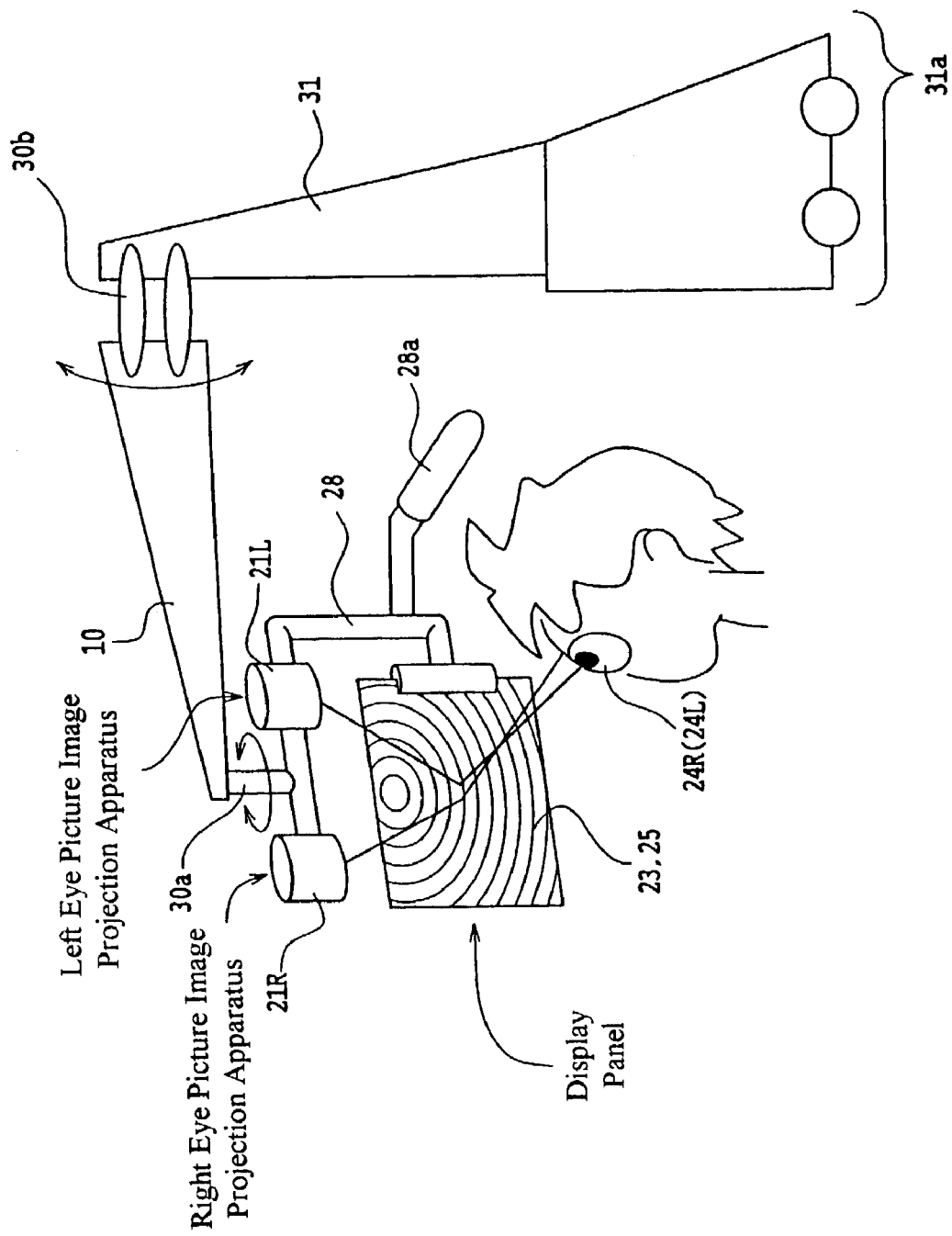
FIG. 28 illustrates one example of a product which uses an embodiment of the 3-D display apparatus of the present invention.

FIG. 28 illustrates one embodiment of a product to which the 3-D display apparatus of the present invention has been applied. This embodiment is a reflective 3-D display apparatus having a display panel 23, 25 that is supported by a holding member 28 that also supports right and left projection apparatuses 21R, 21L. The 3-D display apparatus projects onto the display panel images from the right and left projection apparatuses that have parallax, and these images are then reflected by the display panel and displayed so that they can be viewed by an observer from observation pupils which have been enlarged by diffusion.

The holding member 28 is connected to the support arm 10 via a connecting unit 30a so as to be movable in the direction indicated by the double-headed arrow, and the support arm 10 is connected to the support unit main body 31 via a connecting unit 30b so as to be movable in the direction indicated by the double-headed arrow. Furthermore, by moving the holding member 28 and the support arm 10 in a desired direction, it is possible for the observer to change his observing posture. In addition, a handle 28a is provided on the holding member 28, for facilitating grasping and repositioning of the holding member 28. Also, the support unit main body 31 may include casters 31a. By moving the support unit main body 31 it is possible for the observer to change his observation position.

Figure 29:
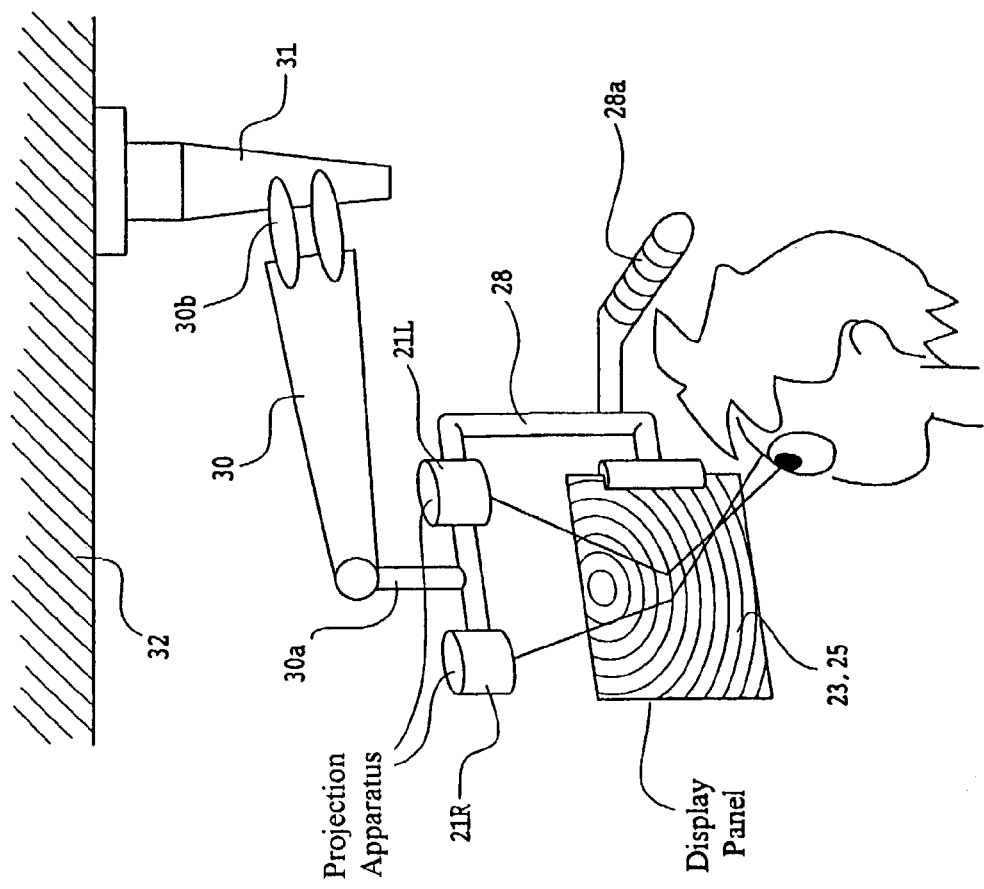
FIG. 29 illustrates another example of a product which uses an embodiment of the 3-D display apparatus of the present invention.

FIG. 29 illustrates another embodiment of a product to which the 3-D display apparatus of the present invention has been applied. The product of this embodiment is composed of a support unit main body 31 which is attached to a ceiling 32. The support unit main body 31 supports the support arm 30. The support arm 30, in turn, supports the same 3-D display apparatus as illustrated in FIG. 28. With the apparatus of this embodiment, it is possible to reduce the space needed by the 3-D display apparatus.

Figure 30:
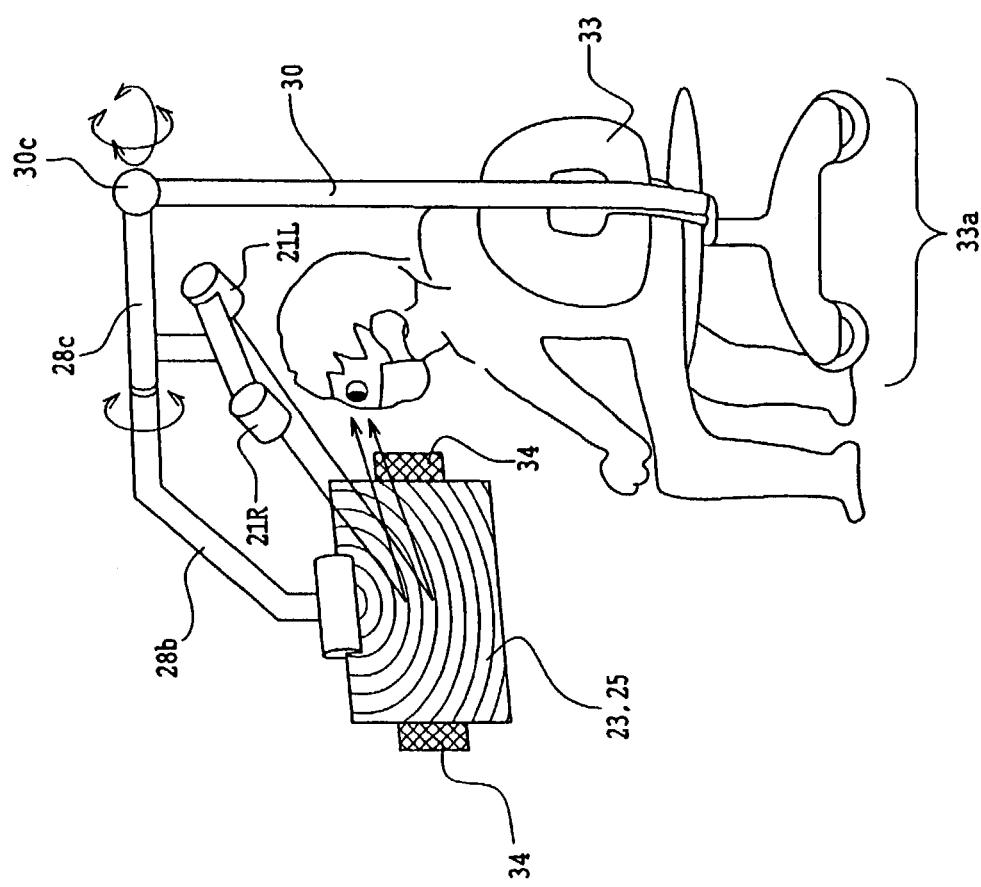
FIG. 30 illustrates another example of a product which uses an embodiment of the 3-D display apparatus of the present invention.

FIG. 30 illustrates still another embodiment of a product to which the 3-D display apparatus of the present invention has been applied. The product of this embodiment is composed of a support arm 30 which is attached to a chair 33 that is used during surgery. The display panel in this embodiment is attached to a holding member 28b, and the projection apparatus is attached to a holding member 28c. In addition, the holding member 28b is movably attached to a holding member 28c so as to be rotatable as shown by the double-headed arrow. Consequently, it is possible to change the orientation of the display panel with respect to the projection apparatus. The holding member 28c, to which the projection apparatus is attached, is in turn attached to the support arm 30 via a connecting unit 30c so as to be movable 360°, thereby making it possible to change the orientation of the display panel and projection apparatus as a unit, as indicated by the two double-headed arrows. Furthermore, handles 34 are attached to the right and left sides of the display panel. Consequently, the action of adjusting the orientation can be easily accomplished without placing the hands in direct contact with the display panel. In addition, casters 33a are provided on the chair 33 which may be used during surgery. Consequently, it is possible to change the observation position by causing the chair to move.

Figure 31:
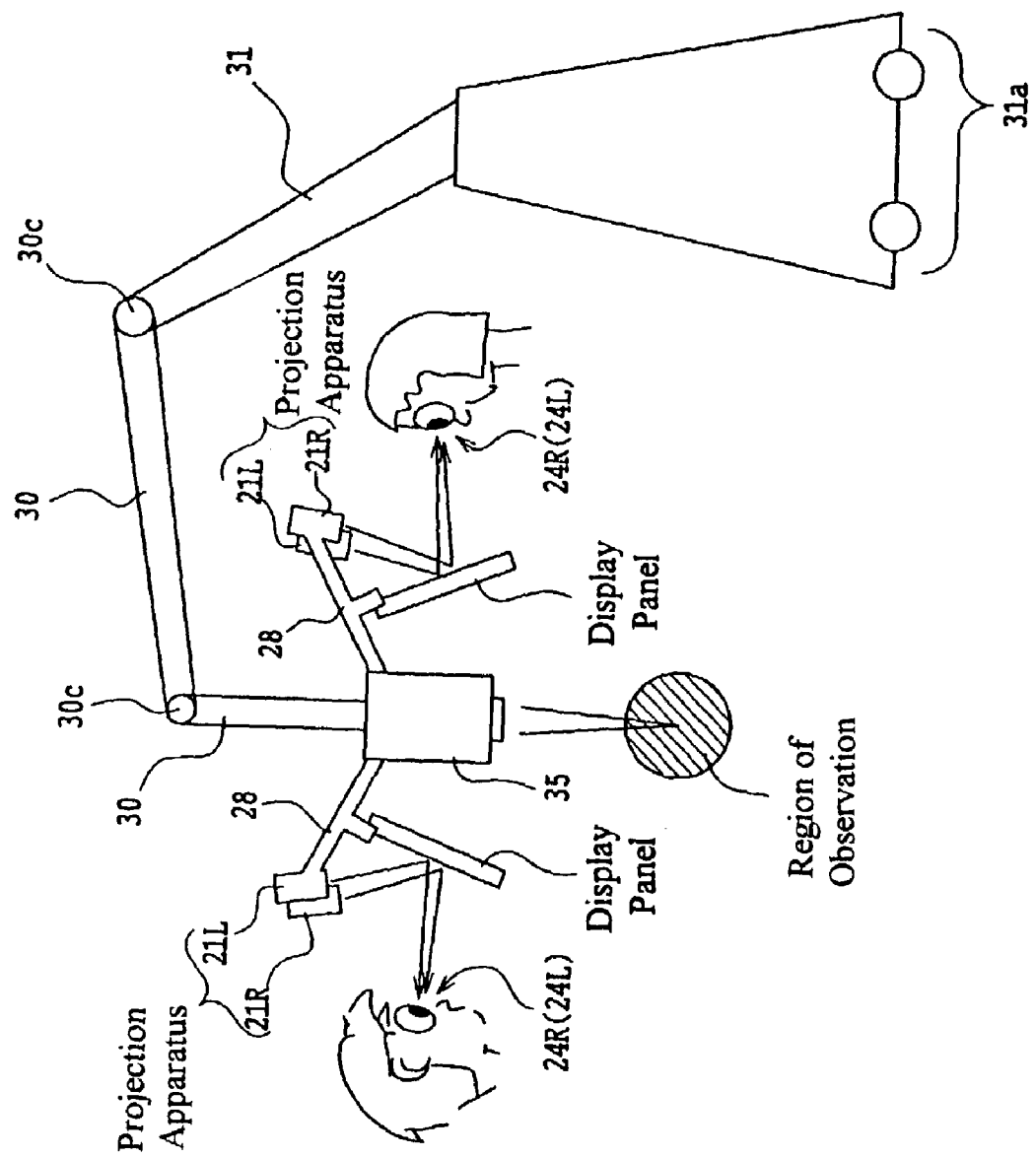
FIG. 31 illustrates another example of a product which uses an embodiment of the 3-D display apparatus of the present invention.
Figure 32:
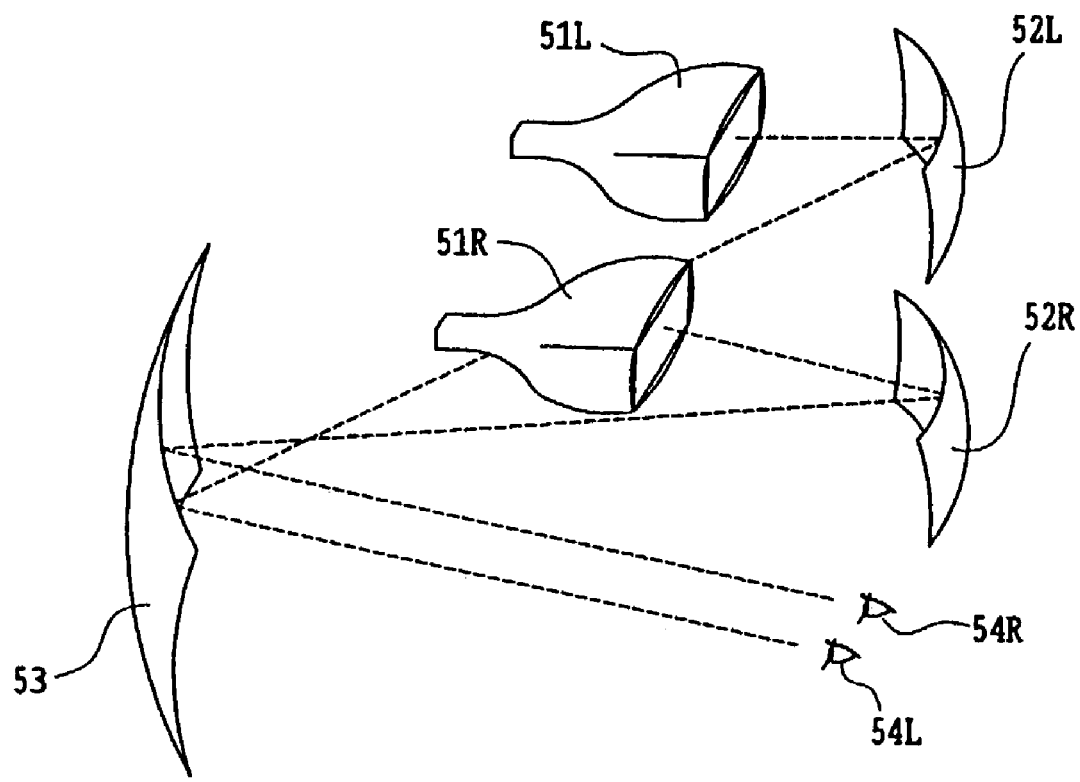
FIG. 32 illustrates a prior art example of a 3-D observation apparatus, as seen in perspective view.
Figure 33:
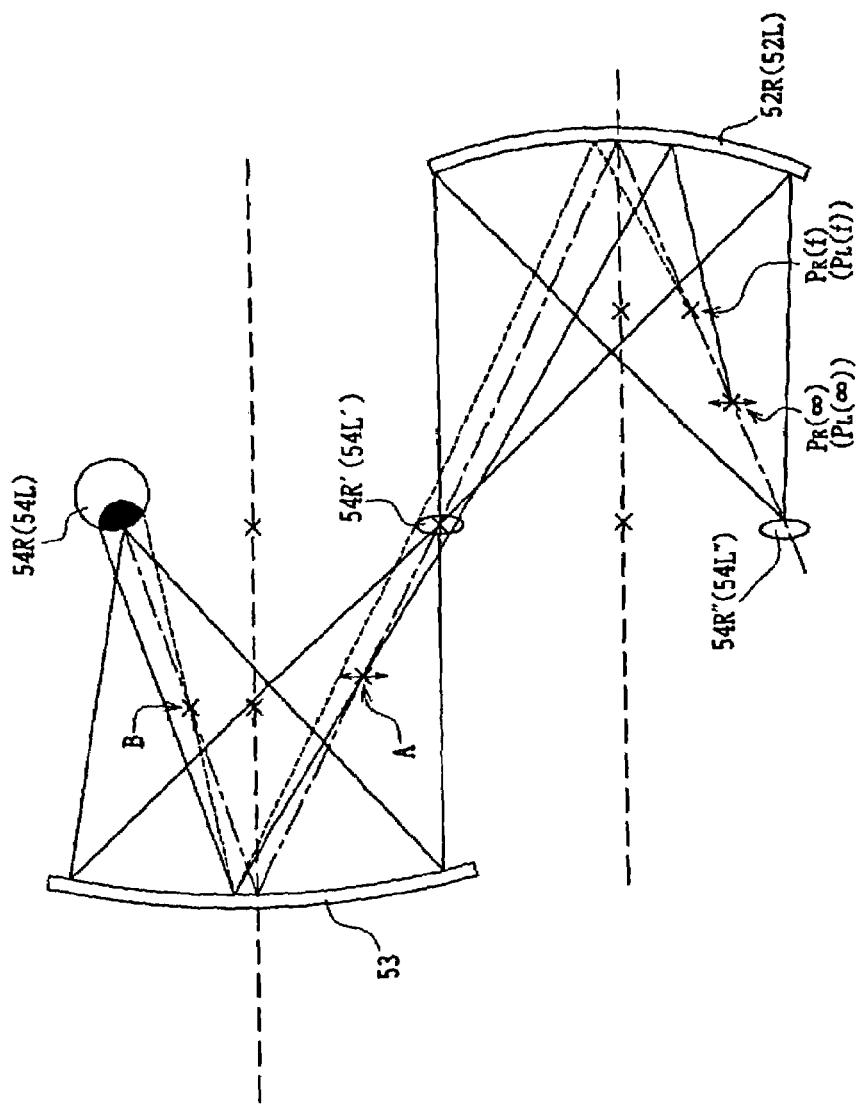
FIG. 33 illustrates the prior art 3-D observation apparatus of FIG. 32, but as seen from the side.

FIG. 31 is an explanatory drawing showing another embodiment of a product to which the 3-D display apparatus of the present invention has been applied. The product of this embodiment is formed of two 3-D display apparatuses in which each projection apparatus and a display panel are attached to a holding member 28. The holding members 28 are each attached to an image input unit 35 of a surgical microscope that is supported by two movable support arms 30 which are connected via a connecting unit 30c. One of the support arms 30 is connected by another connecting unit 30c to a support unit main body 31, on which casters 31a are provided.

Two cameras are housed in the image input unit 35 of the surgical microscope, and input images are sent to the projection apparatuses of each of the 3-D observation apparatuses. Consequently, it is possible for the 3-D images of the surgical microscope to be observed simultaneously by a plurality of observers.

Moreover, the 3-D display apparatuses of the products in the embodiments shown in FIGS. 28–31 can be applied to display apparatuses of surgical microscopes, display apparatuses of endoscopes, display apparatuses for 3-D information images related to medicine, display apparatuses for entertainment products such as game equipment using computers, display apparatuses for 3-D images related to business such as various 3-D CAD images, and so forth.

In addition, the composition shown as the reflective 3-D display apparatus in each of the above-described embodiments can be applied to a transmissive 3-D display apparatus if the display panel comprises a transmissive Fresnel lens.

Besides this, it would also be fine to use a DMD liquid crystal or a reflective liquid crystal as the image display element positioned within the projection optical system. In addition, the objectives of the present invention can be achieved even with a display panel that does not have a diffusion action.

With the 3-D observation apparatus and 3-D observation system of the present invention as described above, it is possible to provide a personal 3-D observation apparatus and 3-D observation system, without glasses, such that it is possible to make simultaneous observations of a plurality of 3-D images, or a 2-D image and a 3-D image, a bright image is obtained, there is great freedom in the position at which observations can be accomplished with the observer's pupils, no distortion of the image is created even if the pupils move, and observations can be made from a comfortable observation posture.

The invention being thus described, it will be obvious that the same may be varied in many ways. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A 3-D observation apparatus comprising a 3-D display apparatus, another display apparatus, and at least one display panel wherein:
   said 3-D display apparatus is provided with at least two projection devices;
   said two projection devices are each provided with an opening, and are positioned so that images are projected onto a surface of said at least one display panel through the two openings;
   each said at least one display panel is provided with an image-forming element so that images of said openings, and an image of an opening of at least one additional projection device that is associated with said another display apparatus, are formed at observation pupils;
   the observation pupils of said 3-D display apparatus overlap the observation pupil of said another display apparatus so that it allows to observe simultaneously both of the images formed on said at least one display panel by the 3-D display apparatus and either
      (a) an image that is projected onto a different part of the surface of said at least one display panel by said another display apparatus, or
      (b) an image that is projected onto a surface of another display panel by said another display apparatus; and
   the light at said observation pupils of said 3-D display apparatus from images projected onto said surface of the at least one display panel by the 3-D display apparatus intersects at a non-zero angle the light from the image that is projected onto a surface according to alternatives (a) or (b) above by said another display apparatus so that the 3-D image from the 3-D display apparatus and the image from said another display apparatus are viewable as different real images in a non-superimposed state.

2. The 3-D observation apparatus of claim 1, and further comprising a diffuser, wherein said diffuser is positioned in the vicinity of a surface of the at least one display panel so as to enlarge the images of said openings.

3. The 3-D observation apparatus of claim 2, wherein:
each said image-forming element is a reflective optical member such that said at least two projection devices and said observation pupils are on the same side of the at least one display panel.

4. The 3-D observation apparatus of claim 2, wherein the observation pupils of the 3-D display apparatus do not mutually overlap.

5. The 3-D observation apparatus of claim 2, wherein:
said image-forming element is a transmissive optical member.

6. The 3-D observation apparatus of claim 2, wherein:
said other display apparatus is a 2-D display apparatus; and,
the observation pupil created by said 2-D display apparatus includes the two observation pupils created by said 3-D display apparatus.

7. The 3-D observation apparatus of claim 2, wherein said another display apparatus is a 3-D display apparatus.

8. The 3-D observation apparatus of claim 2, wherein:
said another display apparatus is provided with a display panel that is positioned adjacent to, and either above or below, the display panel that receives said images formed by said 3-D display apparatus.

9. The 3-D observation apparatus of claim 2, wherein:
said another display apparatus is provided with a display panel that is positioned adjacent to, and either to the left or to the right of, the display panel that receives said images formed by said 3-D display apparatus.

10. The 3-D observation apparatus of claim 2, wherein the diffuser is a transmission hologram.

11. The 3-D observation apparatus of claim 10, wherein the diffuser has a diffusion angle less than 8 degrees, as measured between the 50% maximum intensity points on the light emission profile.

12. The 3-D observation apparatus of claim 10, wherein the diffuser has a diffusion angle less than 12 degrees, as measured between the 10% maximum intensity points on the light emission profile.

13. A 3-D observation system comprising a 3-D display apparatus, another display apparatus, at least one display panel, and an image input apparatus, wherein:
said 3-D display apparatus is provided with at least two projection devices;
said at least two projection devices have openings, and are positioned so that images are projected onto a surface of said at least one display panel through said openings;
each said at least one display panel is provided with an image-forming element;
images of said openings are formed at 3-D observation pupils; and
each of said 3-D observation pupils overlap an observation pupil formed by the image-forming element of a display panel that receives an image that is projected by said another display apparatus so that, by placing one's eyes at the 3-D observation pupils, one can simultaneously observe a 3-D image projected by said 3-D display apparatus and an image that is projected by said another display apparatus, with the light from the images formed by the 3-D display apparatus intersecting at a non-zero angle the light from the image formed by said another display apparatus so that the images from the 3-D display apparatus and the image from said another display apparatus are viewable as different real images in a non-superimposed state.

14. The 3-D observation system of claim 13, and further including one or more diffusers, wherein said diffuser is positioned at or near a respective display panel surface so that the images-of projector openings are enlarged at the observation pupils without substantially affecting the quality of images formed on the respective display panel surface.

15. The 3-D observation system of claim 14, wherein said at least two projection devices and said at least one display panel are held by a holding member such that the relative positions of these components are fixed.

16. The 3-D observation system of claim 14, wherein:
said other display apparatus is a 2-D display apparatus; and,
the observation pupil created by said 2-D display apparatus includes the two observation pupils created by said 3-D display apparatus.

17. The 3-D observation system of claim 14, wherein said another display apparatus is a 3-D display apparatus.

18. The 3-D observation system of claim 14, wherein:
said another display apparatus is provided with a display panel that is positioned adjacent to, and either above or below, the display panel that receives said images formed by said 3-D display apparatus.

19. The 3-D observation system of claim 14, wherein:
said another display apparatus is provided with a display panel that is positioned adjacent to, and either to the left or to the right of, the display panel that receives said images formed by said 3-D display apparatus.

20. The 3-D observation system of claim 14, wherein:
said image input apparatus is an endoscope; and,
the endoscope is capable of outputting two images for accomplishing a 3-D observation as well as an image for accomplishing 2-D observation.

21. The 3-D observation system of claim 14, wherein:
said image input apparatus comprises an endoscope and a microscope; and,
one of said endoscope and said microscope is capable of outputting two images for accomplishing 3-D observation.

22. The 3-D observation system of claim 14, wherein the diffuser is a transmission hologram.

23. The 3-D observation system of claim 22, wherein the diffuser has a diffusion angle less than 8 degrees, as measured between the 50% maximum intensity points on the light emission profile.

24. The 3-D observation system of claim 22, wherein the diffuser has a diffusion angle less than 12 degrees, as measured between the 10% maximum intensity points on the light emission profile.

25. The 3-D observation system of claim 13, wherein said at least two projection devices and said at least one display panel are held by a holding member such that the relative positions of these components are fixed.

* * * * *